(12) United States Patent
Subramanian et al.

(10) Patent No.: US 12,705,212 B2
(45) **Date of Patent: *Aug. 11, 2026**

(54) FACILITATING IMMEDIATE PERFORMANCE OF VOLUME RESYNCHRONIZATION WITH THE USE OF PASSIVE CACHE ENTRIES

(71) Applicant: NetApp, Inc., San Jose, CA (US)

(72) Inventors: Murali Subramanian, Karnataka (IN); Sohan Shetty, Bangalore (IN); Rakesh Bhargava, Karnataka (IN); Akhil Kaushik, Karnataka (IN)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/787,654

(22) Filed: Jul. 29, 2024

(65) Prior Publication Data

US 2024/0385995 A1 Nov. 21, 2024

Related U.S. Application Data

(63) Continuation of application No. 18/448,325, filed on Aug. 11, 2023, now Pat. No. 12,050,558, which is a (Continued)

(51) Int. Cl.

*G06F 16/17* (2019.01)
*G06F 3/06* (2006.01)

(Continued)

(52) U.S. Cl.

CPC .......... *G06F 16/178* (2019.01); *G06F 3/0614* (2013.01); *G06F 3/065* (2013.01);

(Continued)

(58) Field of Classification Search

CPC ...... G06F 16/178; G06F 3/0614; G06F 3/065; G06F 16/172; G06F 16/2365; G06F 11/2069; G06F 11/2092

See application file for complete search history.

(56) References Cited

U.S. PATENT DOCUMENTS

| | | | |
|---|---|---|---|
| 4,853,875 | A | 8/1989 | Brown |
| 5,742,792 | A | 4/1998 | Yanai et al. |

(Continued)

OTHER PUBLICATIONS

Non-Final Office Action mailed Jan. 17, 2023 for U.S. Appl. No. 17/881,381, filed Aug. 4, 2022, 18 pages.

(Continued)

*Primary Examiner* — Masud K Khan

(74) *Attorney, Agent, or Firm* — Jaffery Watson Hamilton & DeSanctis LLP

(57) ABSTRACT

Systems and methods for reducing delays between the time at which a need for a resynchronization of data replication between a volume of a local CG and its peer volume of a remote CG is detected and the time at which the resynchronization is triggered (Reseed Time Period) are provided. According to an example, information indicative of the direction of data replication between the volume and the peer volume is maintained within a cache of a node. Responsive to a disruptive operation (e.g., relocation of the volume from a first node to a second node), the Reseed Time Period is lessened by proactively adding a passive cache entry to a cache within the second node at the time the CG relationship is created when the second node represents an HA partner of the first node and prior to the volume coming online when the second node represents a non-HA partner.

20 Claims, 13 Drawing Sheets

Related U.S. Application Data continuation of application No. 17/505,962, filed on Oct. 20, 2021, now Pat. No. 11,892,982.

(51) Int. Cl.
*G06F 11/20* (2006.01)
*G06F 16/172* (2019.01)
*G06F 16/178* (2019.01)
*G06F 16/23* (2019.01)

(52) U.S. Cl.
CPC ........ *G06F 16/172* (2019.01); *G06F 16/2365* (2019.01); *G06F 11/2069* (2013.01); *G06F 11/2092* (2013.01)

(56) References Cited

U.S. PATENT DOCUMENTS 6,389,551 B1 5/2002 Yount
6,415,372 B1 7/2002 Zakai et al.
6,732,124 B1 5/2004 Koseki et al.
7,039,827 B2 5/2006 Meyer et al.
7,475,204 B2 1/2009 Buah et al.
7,500,014 B1 3/2009 Jacobson et al.
7,631,066 B1 12/2009 Schatz et al.
7,640,451 B2 12/2009 Meyer et al.
7,644,305 B2 1/2010 Friedrich et al.
7,890,626 B1 2/2011 Gadir
8,498,967 B1 7/2013 Chatterjee et al.
8,645,623 B1 2/2014 O'Shea et al.
8,856,583 B1 10/2014 Msser et al.
8,874,960 B1 10/2014 Khan et al.
9,189,341 B1 11/2015 Natanzon et al.
10,412,066 B1 9/2019 Vemuri
10,489,230 B1 11/2019 Chen et al.
10,496,320 B2 12/2019 Eisler et al.
10,725,691 B1 7/2020 Kaushik et al.
10,761,768 B1 9/2020 Kaushik et al.
11,036,423 B2 6/2021 Kaushik et al.
11,089,105 B1 8/2021 Karumbunathan et al.
11,327,857 B2 5/2022 Bhargava et al.
11,360,867 B1 6/2022 Subramanian et al.
11,409,622 B1 8/2022 Kaushik et al.
11,481,139 B1 10/2022 Mjayan et al.
11,537,314 B1 12/2022 Subramanian et al.
11,550,679 B2 1/2023 Kaushik et al.
11,675,503 B1 6/2023 Ekins
11,892,982 B2 2/2024 Subramanian et al.
11,893,261 B2 2/2024 Narasingarayanapeta
11,893,264 B1 2/2024 Mjayan
11,934,670 B2 3/2024 Subramanian et al.
12,045,491 B2 7/2024 Subramanian et al.
12,050,558 B2 7/2024 Subramanian et al.
12,321,621 B2 6/2025 Subramanian et al.
2002/0132613 A1 9/2002 Leung et al.
2003/0037029 A1 2/2003 Holenstein et al.
2004/0153719 A1 8/2004 Achiwa et al.
2004/0267809 A1 12/2004 East et al.
2005/0229034 A1 10/2005 Fujibayashi
2005/0270855 A1 12/2005 Earhart et al.
2006/0095478 A1 5/2006 Cherkauer et al.
2006/0136354 A1 6/2006 Bell et al.
2006/0150006 A1 7/2006 Mizutani
2006/0236048 A1 10/2006 Deguchi et al.
2007/0016754 A1 1/2007 Testardi
2007/0180307 A1 8/2007 Zohar et al.
2007/0234006 A1 10/2007 Radulescu et al.
2008/0201702 A1 8/2008 Bunn
2009/0043979 A1 2/2009 Jarvis
2009/0089609 A1 4/2009 Baba
2009/0307530 A1 12/2009 Tarta
2010/0064168 A1 3/2010 Smoot et al.
2010/0082962 A1 4/2010 Srinivasan et al.
2010/0161554 A1 6/2010 Datuashvili et al.
2011/0106855 A1 5/2011 Resch et al.
2011/0314148 A1 12/2011 Petersen et al.
2012/0151249 A1 6/2012 Swan et al.
2012/0259961 A1 10/2012 Winokur
2013/0159620 A1 6/2013 Sakashita et al.
2014/0298136 A1 10/2014 Resch et al.
2015/0006949 A1 1/2015 Bittles et al.
2015/0058838 A1 2/2015 Tsirkin
2015/0378767 A1 12/2015 Tarasuk-Levin et al.
2016/0063083 A1 3/2016 Mu et al.
2016/0366226 A1 12/2016 Friedman et al.
2017/0093983 A1 3/2017 Everhart et al.
2018/0260125 A1 9/2018 Botes et al.
2018/0352032 A1 12/2018 Liu et al.
2019/0004908 A1 1/2019 Gopinath et al.
2019/0034286 A1 1/2019 Brown et al.
2019/0129976 A1 5/2019 Cha et al.
2019/0163373 A1 5/2019 Compton et al.
2019/0212924 A1* 7/2019 Ward .................... G06F 3/0619
2019/0229978 A1 7/2019 Rajvaidya et al.
2019/0347352 A1 11/2019 Gochkov et al.
2019/0394266 A1 12/2019 Fukuyama et al.
2020/0034258 A1 1/2020 Avraham et al.
2020/0050495 A1 2/2020 Voutilainen et al.
2020/0050587 A1 2/2020 Kaushik et al.
2020/0081801 A1* 3/2020 Brown .................... G06F 3/067
2020/0125460 A1 4/2020 Selvaraj et al.
2020/0133520 A1 4/2020 Patnaik et al.
2020/0242130 A1 7/2020 Chen et al.
2020/0273984 A1 8/2020 Nakano et al.
2020/0274812 A1 8/2020 Ouyang
2020/0278984 A1 9/2020 Kaushik et al.
2020/0319982 A1 10/2020 Rusev et al.
2021/0303165 A1 9/2021 Kaushik et al.
2021/0374157 A1 12/2021 Reddy et al.
2022/0019350 A1 1/2022 Karr
2022/0121533 A1 4/2022 Kumar et al.
2022/0284328 A1 9/2022 Wang
2022/0317896 A1 10/2022 Valan et al.
2022/0318104 A1 10/2022 Bhargava et al.
2022/0318105 A1 10/2022 Subramanian et al.
2022/0357855 A1 11/2022 Narasingarayanapeta
2022/0374321 A1 11/2022 Kaushik et al.
2023/0119175 A1 4/2023 Kaushik et al.
2023/0161495 A1 5/2023 Narasingarayanapeta
2023/0168834 A1 6/2023 Narasingarayanapeta
2023/0289076 A1 9/2023 Subramanian et al.
2024/0012575 A1 1/2024 Narasingarayanapeta
2024/0393973 A1 11/2024 Subramanian et al.
2025/0165167 A1 5/2025 Vijan et al.

OTHER PUBLICATIONS

Non-Final Office Action mailed on Apr. 13, 2023 for U.S. Appl. No. 18/066,775, filed Dec. 15, 2022, 16 pages.
Non-Final Office Action mailed on Aug. 30, 2024 for U.S. Appl. No. 18/320,788, filed May 19, 2023, 08 pages.
Non-Final Office Action mailed on Feb. 17, 2023 for U.S. Appl. No. 17/510,795, filed Oct. 26, 2021, 11 pages.
Non-Final Office Action mailed on Mar. 16, 2023 for U.S. Appl. No. 17/970,961, filed Oct. 21, 2022, 6 pages.
Notice of Allowance mailed Dec. 13, 2022 for U.S. Appl. No. 17/219,815, filed Mar. 31, 2021.
Notice of Allowance mailed Nov. 2, 2022 for U.S. Appl. No. 17/495,990, filed Oct. 7, 2021,8 pages.
Notice of Allowance mailed Nov. 18, 2022 for U.S. Appl. No. 17/219,812, filed Mar. 31, 2021, 12 pages.
Notice of Allowance mailed Oct. 31, 2022 for U.S. Appl. No. 17/219,812, filed Mar. 31, 2021, 9 pages.
Notice of Allowance mailed on Apr. 7, 2023 for U.S. Appl. No. 17/219,740, filed Mar. 31, 2021, 7 pages.
Notice of Allowance mailed on Feb. 2, 2024 for U.S. Appl. No. 17/219,759, filed Mar. 31, 2021, 05 pages.
Notice of Allowance mailed on Jan. 2, 2024 for U.S. Appl. No. 17/505,962, filed Oct. 20, 2021, 02 pages.
Notice of Allowance mailed on Jun. 14, 2023 for U.S. Appl. No. 17/505,962, filed Oct. 20, 2021, 8 pages.
Notice of Allowance mailed on Mar. 3, 2023 for U.S. Appl. No. 17/219,815, filed Mar. 31, 2021, 5 pages.

(56) References Cited

OTHER PUBLICATIONS

Notice of Allowance mailed on Mar. 13, 2024 for U.S. Appl. No. 18/053,561, filed Nov. 8, 2022, 08 pages.
Notice of Allowance mailed on Mar. 20, 2023 for U.S. Appl. No. 17/219,740, filed Mar. 31, 2021, 11 pages.
Notice of Allowance mailed on May 31, 2024 for U.S. Appl. No. 18/448,325, filed Aug. 11, 2023, 8 pages.
Notice of Allowance mailed on Sep. 20, 2023 for U.S. Appl. No. 17/219,759, filed Mar. 31, 2021, 07 pages.
Notice of Allowance mailed on Sep. 20, 2023 for U.S. Appl. No. 17/505,962, filed Oct. 20, 2021, 08 pages.
Pan L, "Paxos at Its Heart is Very Simple," Distributed System, 2018, Retrieved From : URL: https://blog.the-pans.com/paxos-explained/, pp. 1-12.
U.S. Non-Final Office action dated Dec. 21, 2021 in U.S. Appl. No. 17/238,829, filed Apr. 23, 2021, 20 pages.
U.S. Notice of Allowance dated Apr. 6, 2022 in U.S. Appl. No. 17/238,829, filed Apr. 23, 2021, 9 pages.
U.S. Notice of Allowance mailed Jun. 24, 2022 in U.S. Appl. No. 17/219,816, filed Mar. 31, 2021, 8 pages.
U.S. Notice of Allowance mailed May 6, 2022 in U.S. Appl. No. 17/219,746, filed Mar. 31, 2021, 18 pages.
U.S. Notice of Allowance mailed Oct. 26, 2022 in U.S. Appl. No. 17/219,812, filed Mar. 31, 2021, 9 pages.
Non-Final Office Action mailed on Jun. 9, 2025 for U.S. Appl. No. 18/673,753, filed May 24, 2024, 12 pages.
Notice of Allowance mailed on Jan. 13, 2025 for U.S. Appl. No. 18/320,788, filed May 19, 2023, 09 pages.
Notice of Allowance mailed on Nov. 19, 2025 for U.S. Appl. No. 18/673,753, filed May 24, 2024, 08 pages.

* cited by examiner

FACILITATING IMMEDIATE PERFORMANCE OF VOLUME RESYNCHRONIZATION WITH THE USE OF PASSIVE CACHE ENTRIES

RELATED APPLICATIONS

This application is a continuation of U.S. patent application Ser. No. 18/448,325, filed Aug. 11, 2023, which is a continuation of U.S. patent application Ser. No. 17/505,962, filed Oct. 20, 2021, which is hereby incorporated by reference in its entirety for all purposes.

BACKGROUND

Field

Various embodiments of the present disclosure generally relate to multi-site distributed data storage systems. In particular, some embodiments relate to seeding volume-level consistency group (CG) relationship information for a volume undergoing a disruptive operation into a new storage node of a cross-site storage solutions (e.g., cross-site high-availability (HA) storage solutions and cross-site asynchronous disaster recovery (DR) solutions) prior to the volume coming online in the new storage node.

Description of the Related Art

Multiple storage nodes organized as a cluster may provide a distributed storage architecture configured to service storage requests issued by one or more clients of the cluster. The storage requests are directed to data stored on storage devices coupled to one or more of the storage nodes of the cluster. The data served by the storage nodes may be distributed across multiple storage units embodied as persistent storage devices, such as hard disk drives (HDDs), solid state drives (SSDs), flash memory systems, or other storage devices. The storage nodes may logically organize the data stored on the devices as volumes accessible as logical units. Each volume may be implemented as a set of data structures, such as data blocks that store data for the volume and metadata blocks that describe the data of the volume.

SUMMARY

Systems and methods are described for reducing delays in connection with performing volume resynchronization. According to one embodiment, after a volume of a consistency group (CG) has been moved from a source node of multiple nodes of the distributed storage system to a destination node of the multiple nodes, those of the multiple nodes that are affected by movement of the volume are identified. Volume ownership information maintained by the distributed storage system is updated to reflect volume ownership changes of the source node and the destination node resulting from the movement of the volume. One or more of (i) modification of an existing cache entry maintained by at least one of the affected nodes, (ii) removal of the existing cache entry, and (iii) creation of a new cache entry by at least another of the affected nodes are selectively caused.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
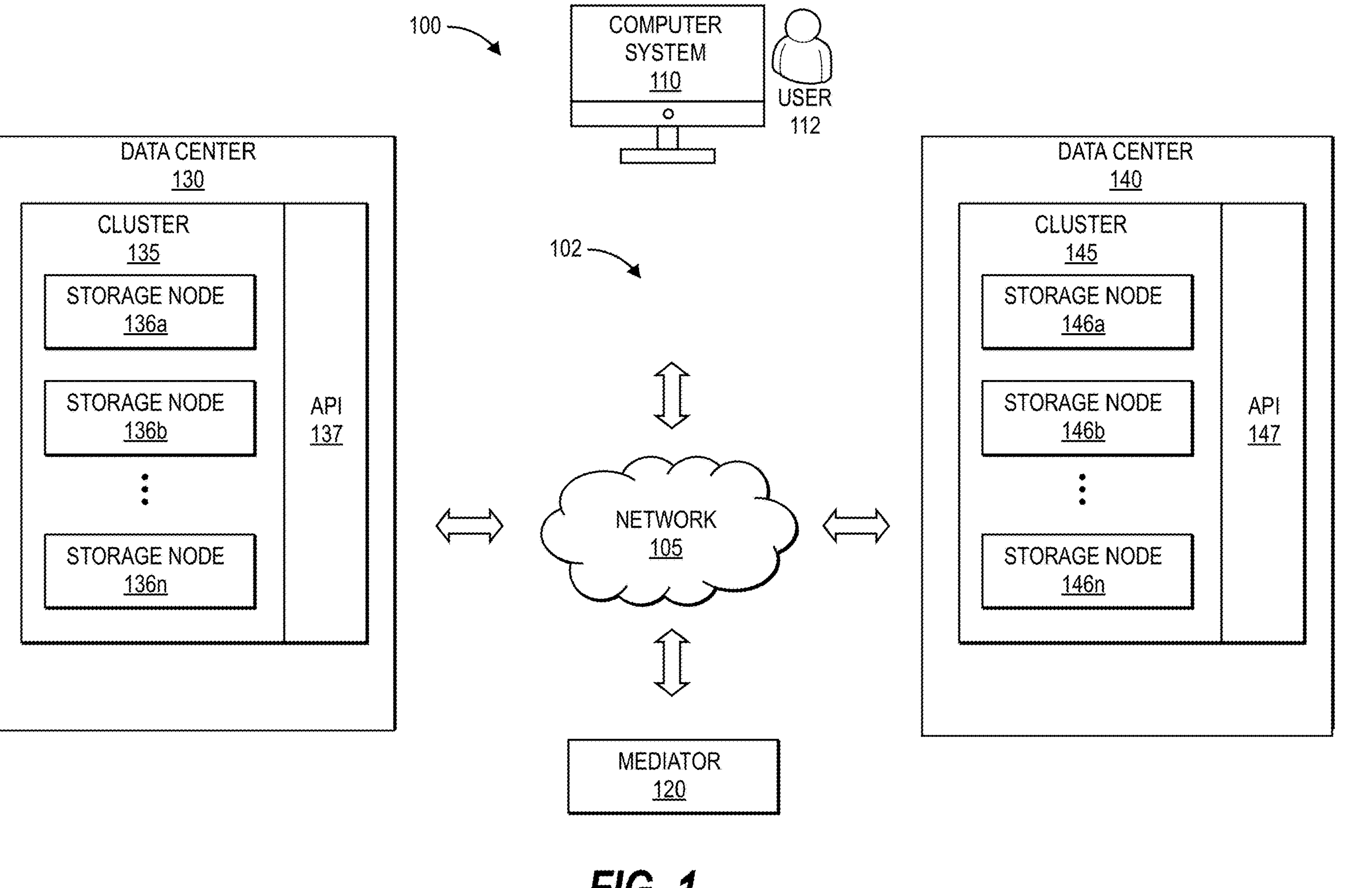
FIG. 1 is a block diagram illustrating an environment in which various embodiments may be implemented.

Systems and methods are described for reducing delays associated with performing volume resynchronization after the occurrence of a disruptive operation. In the context of cross-site storage solutions (including cross-site HA storage solutions that perform synchronous data replication to support zero recovery time objective (RTO) protection and cross-site asynchronous DR solutions), a certain degree of consistency over time is maintained between a mirror copy and a primary dataset depending upon the particular implementation. Certain operations on a set of data containers/volumes (referred to herein as a consistency group (CG)) hosting the data at issue should be managed as a single unit, whereas others (e.g., fast resynchronization of a peered volume pair each located within different data centers) may be performed at the volume level.

When a volume in a CG undergoes a disruptive operation (e.g., moving either the primary or secondary volume location within a cluster from one node to another node or failure of nodes within the primary or secondary cluster), a resynchronization process (e.g., a fast volume-level resynchronization process ("Fast Resync") may be performed to attempt to bring the volumes back into a state (e.g., an InSync state) in which data replication is in synchronization within an application timeout period (e.g., between approximately 30 to 90 seconds). The specific details regarding the Fast Resync process itself (which relates to data plane functionality) are beyond the scope of this disclosure, which focuses on control plane functionality associated with reducing delays between the time at which the need for a resynchronization of the data replication is detected and the time at which the resynchronization process (e.g., Fast Resync or otherwise) is triggered so as to provide sufficient time for the resynchronization process to complete before expiration of the timeout period. This time interval may be referred to herein as the "Reseed Time Period."

Depending on the nature of the disruptive operation (e.g., the number of volumes affected), previous techniques for reseeding volume-level CG relationship information (e.g., the source volume identifier (ID) and destination volume ID of the peered pair of volumes at issue within a local CG of a local distributed storage system and its peer remote CG of a remote distributed storage system), upon which resynchronization is dependent into a cache maintained in kernel space to provide the resynchronization process with access to the volume-level CG relationship information, may take between 10 to 20 seconds to complete. As such, a worst-case Reseed Time Period for the previous techniques might take up to two thirds of the available time for the entire resynchronization process to be completed. The reseeding (which also may be referred to simply as seeding) may involve providing the volume-level CG relationship information from the user space of a new node (to which a particular volume is being relocated) to its kernel memory and causing the volume-level CG relationship information to be cached in affected nodes (e.g., affected either directly or indirectly). For example, the volume-level CG relationship information may be cached in affected nodes in the form of active cache entries or passive cache entries (as appropriate) based on the context and the relationship of the new node to the original node from which the particular volume is being relocated and/or the relationship of the affected node that is being directed to perform the cache update to the new node. In one embodiment, the context may relate to the nature of the disruptive operation that was just completed and for which disruptive operation post-processing is being performed. The relationship of the new node to the original node affected node to the new node may be that of an HA partner of the new node within the same cluster, a non-HA partner of the new node within the same cluster, or the HA partner of the non-HA partner of the new node.

Embodiments described herein seek to improve various technological processes associated with cross-site storage solutions and attempt to avoid input/output (I/O) disruption resulting from an event that temporarily disrupts synchronous replication from impacting an application assigned to the CG at issue. Various embodiments of the present technology provide for a wide range of technical effects, advantages, and/or improvements to stretched storage systems and participating distributed storage systems. For example, various embodiments may include one or more of the following technical effects, advantages, and/or improvements: (i) insulation of applications assigned to affected CGs from being adversely impacted by a disruptive event relating to a member volume; (ii) the ability to maintain a zero recovery point objective (RPO) guarantee when the Fast Resync process is successful within the timeout period; and (iii) more efficient performance of reseeding of volume-level CG relationship information to reduce the Reseed Time Period, thereby allowing the resynchronization process to start immediately by proactively creating passive cache entries as appropriate to address data dependencies of the resynchronization process in advance of the need for such data (e.g., the volume-level CG relationship information).

According to one embodiment, for each volume of a set of volumes hosted on a node of a cluster and that represents either a primary volume (e.g., a source of data replication to a peered member volume of a remote CG) that is a member of a local CG of the cluster or a secondary volume (e.g., a destination of data replication from a peered member volume of the remote CG) that is a member of the remote CG of a remote cluster, an entry is maintained within a cache of the node. The entry may include volume-level CG relationship information (e.g., the source volume identifier (ID) of the primary volume and the destination volume ID of the secondary volume) for the volume. A given cache entry may be marked as an "active" cache entry, which may be used by the resynchronization process or as a "passive" cache entry, which after activated may be used by the resynchronization process. Responsive to a disruptive operation affecting a status of data replication for a first volume of the set of volumes, the delay associated with initiation of resynchronization of the data replication (the Reseed Time Period) may be lessened as a result of the usage of passive cache entries. For example, when the disruptive operation represents a first scenario in which the first volume is being relocated from one node to a new node within the cluster representing its HA partner node, an existing passive cache entry (e.g., created previously responsive to the creation of the CG relationship between the local CG and the remote CG) may already reside within the cache of the HA partner node. As such, there is no need for the HA partner node to obtain the volume-level CG relationship information during the Reseed Time Period and may instead simply convert the existing passive cache entry to an active cache entry to allow the cache entry to be used by the resynchronization process. Alternatively, when the disruptive operation represents a second scenario in which the first volume is being relocated from one node to a new node in the cluster that does not represent its HA partner node, a new passive cache entry may be created within the cache of the non-HA partner node based on the volume-level CG relationship information maintained in a configuration database. Additional details regarding example scenarios are described below with reference to FIGS. 7A-11.

While some embodiments of the present disclosure are described herein with reference to particular usage scenarios in the context of cross-site HA storage solutions, it is to be noted that various embodiments of the present disclosure are applicable to various use cases that arise in the context of cross-cite storage solutions more generally, including cross-site asynchronous DR solutions.

In the following description, numerous specific details are set forth in order to provide a thorough understanding of embodiments of the present disclosure. It will be apparent, however, to one skilled in the art that embodiments of the present disclosure may be practiced without some of these specific details. In other instances, well-known structures and devices are shown in block diagram form.

Terminology

Brief definitions of terms used throughout this application are given below.

A "computer" or "computer system" may be one or more physical computers, virtual computers, or computing devices. As an example, a computer may be one or more server computers, cloud-based computers, cloud-based cluster of computers, virtual machine instances or virtual machine computing elements such as virtual processors, storage and memory, data centers, storage devices, desktop computers, laptop computers, mobile devices, or any other special-purpose computing devices. Any reference to "a computer" or "a computer system" herein may mean one or more computers, unless expressly stated otherwise.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure and may be included in more than one embodiment of the present disclosure. Importantly, such phrases do not necessarily refer to the same embodiment.

Example Operating Environment

FIG. 1 is a block diagram illustrating an environment 100 in which various embodiments may be implemented. In various examples described herein, an administrator (e.g., user 112) of a multi-site distributed storage system 102 having clusters 135 and cluster 145 or a managed service provider responsible for multiple distributed storage systems of the same or multiple customers may monitor various operations and network conditions of the distributed storage system or multiple distributed storage systems via a browser-based interface presented on computer system 110.

In the context of the present example, the multi-site distributed storage system 102 includes a data center 130, a data center 140, and optionally a mediator 120. The data centers 130 and 140, the mediator 120, and the computer system 110 are coupled in communication via a network 105, which, depending upon the particular implementation, may be a Local Area Network (LAN), a Wide Area Network (WAN), or the Internet.

The data centers 130 and 140 may represent an enterprise data center (e.g., an on-premises customer data center) that is owned and operated by a company or the data center 130 may be managed by a third party (or a managed service provider) on behalf of the company, which may lease the equipment and infrastructure. Alternatively, the data centers 130 and 140 may represent a colocation data center in which a company rents space of a facility owned by others and located off the company premises. The data centers are shown with a cluster (e.g., cluster 135, cluster 145). Those of ordinary skill in the art will appreciate additional IT infrastructure may be included within the data centers 130 and 140. In one example, the data center 140 is a mirrored copy of the data center 130 to provide non-disruptive operations at all times even in the presence of failures including, but not limited to, network disconnection between the data centers 130 and 140 and the mediator 120, which can also be located at a data center.

Turning now to the cluster 135, it includes multiple storage nodes 136*a-n* and an Application Programming Interface (API) 137. In the context of the present example, the multiple storage nodes 136*a-n* are organized as a cluster and provide a distributed storage architecture to service storage requests issued by one or more clients (not shown) of the cluster. The data served by the storage nodes 136*a-n* may be distributed across multiple storage units embodied as persistent storage devices, including but not limited to HDDs, SSDs, flash memory systems, or other storage devices. In a similar manner, cluster 145 includes multiple storage nodes 146*a-n* and an Application Programming Interface (API) 147. In the context of the present example, the multiple storage nodes 146*a-n* are organized as a cluster and provide a distributed storage architecture to service storage requests issued by one or more clients of the cluster. In one embodiment, the storage nodes 136*a-n* and storage nodes 146*a-n* are deployed in pairs within their respective clusters so each storage node has a high-availability (HA) partner node within the cluster to which it may failover.

The API 137 may provide an interface through which the cluster 135 is configured and/or queried by external actors (e.g., the computer system 110, data center 140, the mediator 120, clients). Depending upon the particular implementation, the API 137 may represent a Representational State Transfer (REST)ful API that uses Hypertext Transfer Protocol (HTTP) methods (e.g., GET, POST, PATCH, DELETE, and OPTIONS) to indicate its actions. Depending upon the particular embodiment, the API 137 may provide access to various telemetry data (e.g., performance, configuration, storage efficiency metrics, and other system data) relating to the cluster 135 or components thereof. As those skilled in the art will appreciate various other types of telemetry data may be made available via the API 137, including, but not limited to measures of latency, utilization, and/or performance at various levels (e.g., the cluster level, the storage node level, or the storage node component level).

In the context of the present example, the mediator 120, which may represent a private or public cloud accessible (e.g., via a web portal) to an administrator associated with a managed service provider and/or administrators of one or more customers of the managed service provider, includes a cloud-based, monitoring system.

While for sake of brevity, only two data centers are shown in the context of the present example, it is to be appreciated that additional clusters owned by or leased by the same or different companies (data storage subscribers/customers) may be monitored and one or more metrics may be estimated based on data stored within a given level of a data store in accordance with the methodologies described herein and such clusters may reside in multiple data centers of different types (e.g., enterprise data centers, managed services data centers, or colocation data centers).

Figure 2:
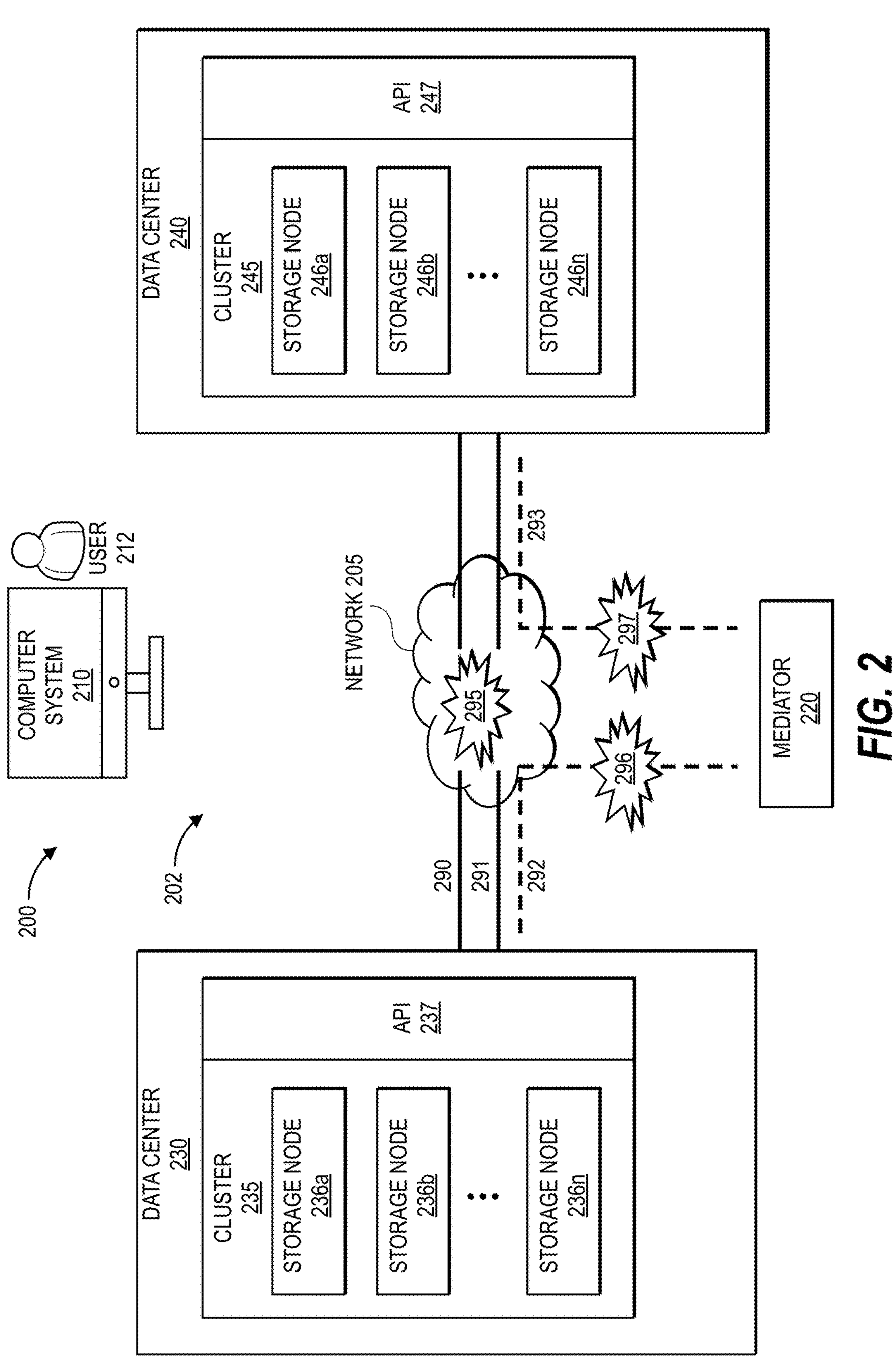
FIG. 2 is a block diagram illustrating an environment having potential failures within a multi-site distributed storage system in which various embodiments may be implemented.

FIG. 2 is a block diagram illustrating an environment 200 having potential failures within a multi-site distributed storage system 202 in which various embodiments may be implemented. In various examples described herein, an administrator (e.g., user 212) of a multi-site distributed storage system 202 having clusters 235 and cluster 245 or a managed service provider responsible for multiple distributed storage systems of the same or multiple customers may monitor various operations and network conditions of the distributed storage system or multiple distributed storage systems via a browser-based interface presented on computer system 210.

In the context of the present example, the system 202 includes data center 230, data center 240, and optionally a mediator 220. The data centers 230 and 240, the mediator 220, and the computer system 210 are coupled in communication via a network 205, which, depending upon the particular implementation, may be a Local Area Network (LAN), a Wide Area Network (WAN), or the Internet.

The data centers 230 and 240 may represent an enterprise data center (e.g., an on-premises customer data center) that is owned and operated by a company or the data center 230 may be managed by a third party (or a managed service provider) on behalf of the company, which may lease the equipment and infrastructure. Alternatively, the data centers 230 and 240 may represent a colocation data center in which a company rents space of a facility owned by others and located off the company premises. The data centers are shown with a cluster (e.g., cluster 235, cluster 245). Those of ordinary skill in the art will appreciate additional IT infrastructure may be included within the data centers 230 and 240. In one example, the data center 240 is a mirrored copy of the data center 230 to provide non-disruptive operations at all times even in the presence of failures including, but not limited to, network disconnection between the data centers 230 and 240 and the mediator 220, which can also be a data center.

The system 202 can utilize communications 290 and 291 to synchronize a mirrored copy of data of the data center 240 with a primary copy of the data of the data center 230. Either of the communications 290 and 291 between the data centers 230 and 240 may have a failure 295. In a similar manner, a communication 292 between data center 230 and mediator 220 may have a failure 296 while a communication 293 between the data center 240 and the mediator 220 may have a failure 297. If not responded to appropriately, these failures whether transient or permanent have the potential to disrupt operations for users of the distributed storage system 202. In one example, communications between the data centers 230 and 240 have approximately a 5-20 millisecond round trip time.

Turning now to the cluster 235, it includes at least two storage nodes 236*a-b*, optionally includes additional storage nodes (e.g., 236*n*) and an Application Programming Interface (API) 237. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

Turning now to the cluster 245, it includes at least two storage nodes 246*a-b*, optionally includes additional storage nodes (e.g., 246*n*) and includes an Application Programming Interface (API) 247. In the context of the present example, the multiple storage nodes are organized as a cluster and provide a distributed storage architecture to service storage requests issued by one or more clients of the cluster. The data served by the storage nodes may be distributed across multiple storage units embodied as persistent storage devices, including but not limited to HDDs, SSDs, flash memory systems, or other storage devices.

In one example, each cluster can have up to 5 CGs with each CG having up to 12 volumes. The system 202 provides a planned failover feature at a CG granularity. The planned failover feature allows switching storage access from a primary copy of the data center 230 to a mirror copy of the data center 240 or vice versa.

Figure 3:
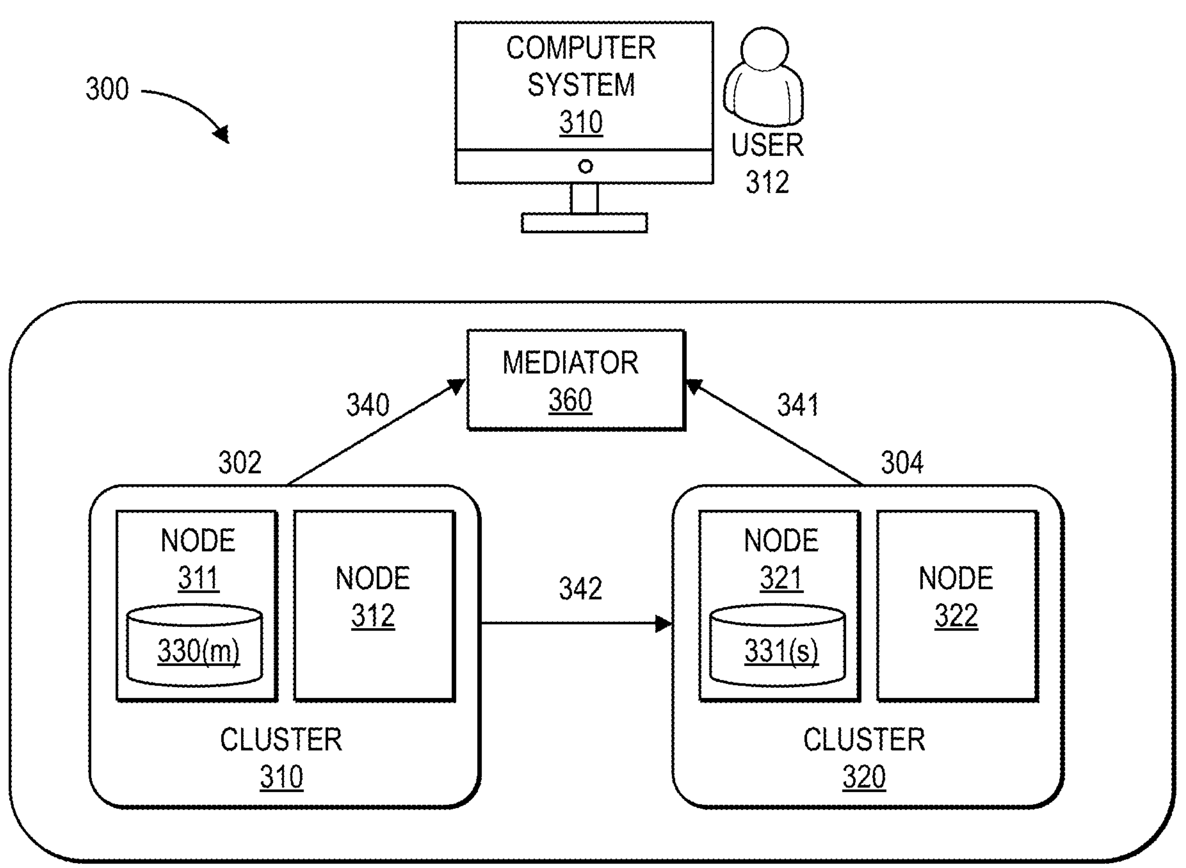
FIG. 3 is a block diagram of a multi-site distributed storage system according to various embodiments of the present disclosure.

FIG. 3 is a block diagram illustrating a multi-site distributed storage system 300 in which various embodiments may be implemented. In various examples described herein, an administrator (e.g., user 312) of the multi-site distributed storage system 302 or a managed service provider responsible for multiple distributed storage systems of the same or multiple customers may monitor various operations and network conditions of the distributed storage system or multiple distributed storage systems via a browser-based interface presented on computer system 310. In the context of the present example, the distributed storage system 300 includes a data center 302 having a cluster 310, a data center 304 having a cluster 320, and a mediator 360. The clusters 310, 320, and the mediator 360 are coupled in communication (e.g., communications 340-342) via a network, which, depending upon the particular implementation, may be a Local Area Network (LAN), a Wide Area Network (WAN), or the Internet.

The cluster 310 includes nodes 311 and 312 while the cluster 320 includes nodes 321 and 322. In one example, the cluster 320 has a data copy 331 that is a mirrored copy of the data copy 330 to provide non-disruptive operations at all times even in the presence of failures including, but not limited to, network disconnection between the data centers 302 and 304 and the mediator 360.

The multi-site distributed storage system 300 provides correctness of data, availability, and redundancy of data. In one example, the node 311 is designated as a primary (master) and the node 321 is designated as a secondary. The master is given preference to serve I/O commands to requesting clients and this allows the primary to obtain a consensus in a case of a race between the clusters 310 and 320. The mediator 360 enables an automated unplanned failover (AUFO) in the event of a failure. The data copy 330 (master), data copy 331 (secondary), and the mediator 360 form a three-way quorum. If two of the three entities reach an agreement for whether the primary or secondary should serve I/O commands to requesting clients, then this forms a strong consensus.

In one embodiment, node 311 may experience a failure and the data copy 331 for a storage object of node 312 remains InSync. The node 312 (e.g., the HA partner of node 311) handles a takeover operation for data copy 330 (master). Upon a volume mount time, the node 311 temporarily disallows input/output operations (e.g., both read and write) with a retriable error. The I/O operations from a computer system 310 are not allowed at node 311 until resynchronization occurs or a timeout occurs. Next, the cluster 320 performs an automatic volume-level Fast Resynchronization (Fast Resync) to maintain zero recovery point objective (RPO) protection. The Fast Resync may be based on reestablishing a Sync Data Path between data copy 330 (master) of node 311 and data copy 330 (secondary) of mirrored node 321, and reconciling inflight regions based on persistent inflight tracking of I/O operations (IFT-P). The secondary storage cluster 320 can be provided with necessary information about a high availability partner to avoid cross-cluster calls between the primary and secondary storage cluster. In one embodiment, no asynchronous transfers or transition are allowed during the Fast Resync, which may establish a transfer engine session and start persistent inflight op tracking replay. A Fast Resync can be triggered as soon a storage object on the secondary storage cluster is mounted. Subsequently, node 311 waits for resumption of synchronous replication and allows I/O upon completion of the synchronous replication. As described further below, if Fast Resync experiences an error or failure resulting in the Fast Resync not being possible within a certain time period (e.g., 30-90 seconds, 60 seconds), then a second type of resynchronization process may be employed at the CG level.

The primary and secondary roles for the clusters 310 and 320 help to avoid a split-brain situation with both of the clusters simultaneously attempting to serve I/O commands. There are scenarios where both primary and secondary copies can claim to be a primary copy. For example, a recovery post failover or failure during planned failover workflow can results in both clusters 310 and 320 attempting to serve I/O commands. In one example, a secondary cannot serve I/O until an AUFO happens. A primary doesn't serve I/O commands until the primary obtains a consensus.

The multi-site distributed storage system 300 presents a single virtual logical unit number (LUN) to a host computer or client using a synchronized-replicated distributed copies of a LUN. A LUN is a unique identifier for designating an individual or collection of physical or virtual storage devices that execute input/output (I/O) commands with a host computer, as defined by the Small System Computer Interface (SCSI) standard. In one example, active or passive access to this virtual LUN causes read and write commands to be serviced only by node 311 (master) while operations received by the node 321 (secondary) are proxied to node 311.

Example Storage Node

Figure 4:
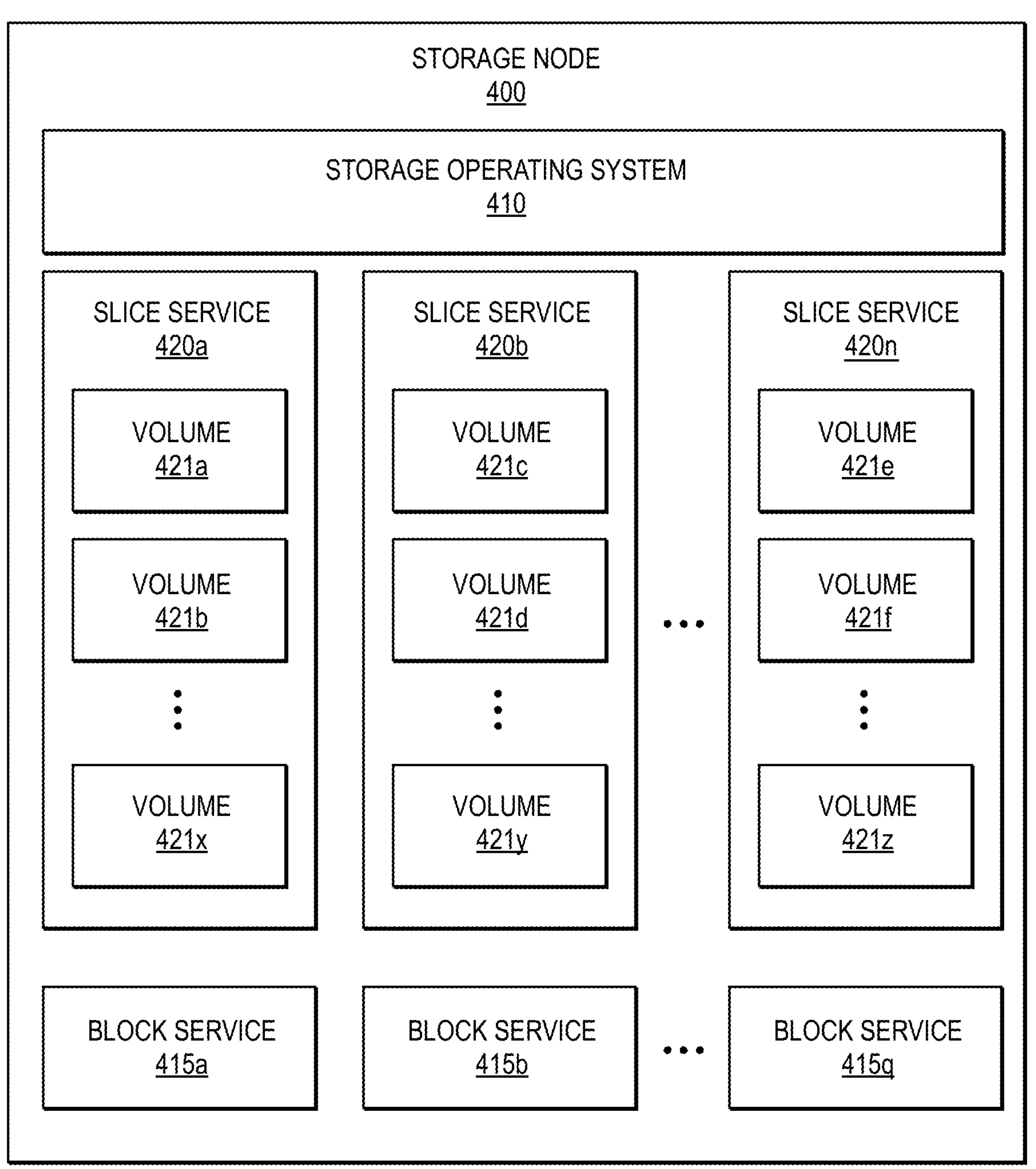
FIG. 4 is a block diagram illustrating a storage node in accordance with an embodiment of the present disclosure.

FIG. 4 is a block diagram illustrating a storage node 400 in accordance with an embodiment of the present disclosure. Storage node 400 represents a non-limiting example of storage nodes (e.g., 136*a-n*, 146*a-n*, 236*a-n*, 246*a-n*, 311, 312, 331, and 322) described herein. In the context of the present example, storage node 400 includes a storage operating system 410, one or more slice services 420*a-n*, and one or more block services 415*a-q*. The storage operating system (OS) 410 may provide access to data stored by the storage node 400 via various protocols (e.g., small computer system interface (SCSI), Internet small computer system interface (ISCSI), fibre channel (FC), common Internet file system (CIFS), network file system (NFS), hypertext transfer protocol (HTTP), web-based distributed authoring and versioning (WebDAV), or a custom protocol. A non-limiting example of the storage OS 410 is NetApp Element Software (e.g., the SolidFire Element OS) based on Linux and designed for SSDs and scale-out architecture with the ability to expand up to 100 storage nodes.

Each slice service 420 may include one or more volumes (e.g., volumes 421*a-x*, volumes 421*c-y*, and volumes 421*e-z*). Client systems (not shown) associated with an enterprise may store data to one or more volumes, retrieve data from one or more volumes, and/or modify data stored on one or more volumes.

The slice services 420*a-n* and/or the client system may break data into data blocks. Block services 415*a-q* and slice services 420*a-n* may maintain mappings between an address of the client system and the eventual physical location of the data block in respective storage media of the storage node 400. In one embodiment, volumes 421 include unique and uniformly random identifiers to facilitate even distribution of a volume's data throughout a cluster (e.g., cluster 135). The slice services 420*a-n* may store metadata that maps between client systems and block services 415. For example, slice services 420 may map between the client addressing used by the client systems (e.g., file names, object names, block numbers, etc. such as Logical Block Addresses (LBAs)) and block layer addressing (e.g., block IDs) used in block services 415. Further, block services 415 may map between the block layer addressing (e.g., block identifiers) and the physical location of the data block on one or more storage devices. The blocks may be organized within bins maintained by the block services 415 for storage on physical storage devices (e.g., SSDs).

As noted above, a bin may be derived from the block ID for storage of a corresponding data block by extracting a predefined number of bits from the block identifiers. In some embodiments, the bin may be divided into buckets or "sublists" by extending the predefined number of bits extracted from the block identifier. A bin identifier may be used to identify a bin within the system. The bin identifier may also be used to identify a particular block service 415*a-q* and associated storage device (e.g., SSD). A sublist identifier may identify a sublist with the bin, which may be used to facilitate network transfer (or syncing) of data among block services in the event of a failure or crash of the storage node 400. Accordingly, a client can access data using a client address, which is eventually translated into the corresponding unique identifiers that reference the client's data at the storage node 400.

For each volume 421 hosted by a slice service 420, a list of block IDs may be stored with one block ID for each logical block on the volume. Each volume may be replicated between one or more slice services 420 and/or storage nodes 400, and the slice services for each volume may be synchronized between each of the slice services hosting that volume. Accordingly, failover protection may be provided in case a slice service 420 fails, such that access to each volume may continue during the failure condition.

Consistency Groups

Figure 5:
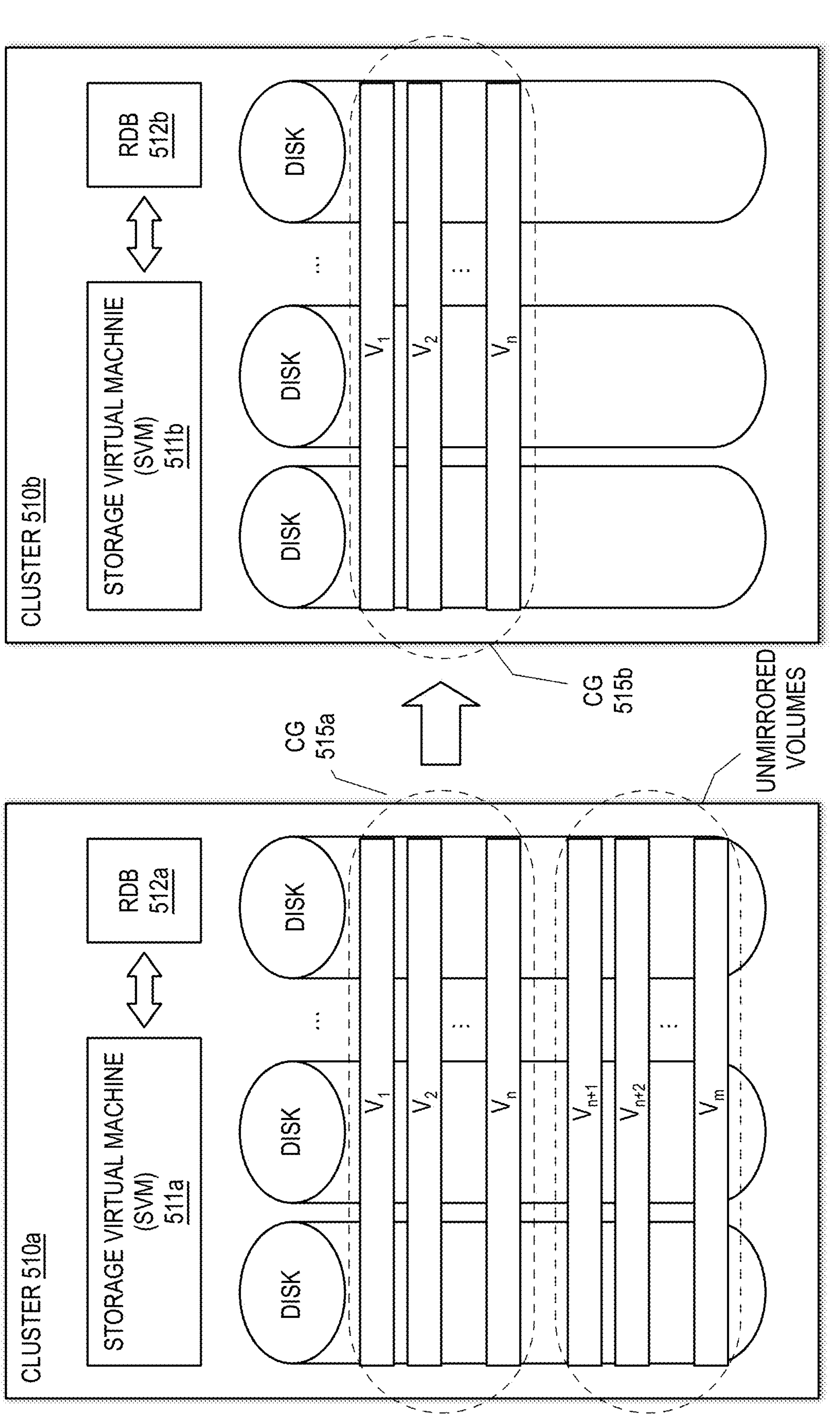
FIG. 5 is a block diagram illustrating the concept of a consistency group (CG) in accordance with an embodiment of the present disclosure.

FIG. 5 is a block diagram illustrating the concept of a consistency group (CG) in accordance with an embodiment of the present disclosure. In the context of the present example, a stretch cluster including two clusters (e.g., cluster 110*a* and 110*b*) is shown. The clusters may be part of a cross-site high-availability (HA) solution that supports zero recovery point objective (RPO) and zero recovery time objective (RTO) protections by, among other things, providing a mirror copy of a dataset at a remote location, which is typically in a different fault domain than the location at which the dataset is hosted. For example, cluster 110*a* may be operable within a first site (e.g., a local data center) and cluster 110*b* may be operable within a second site (e.g., a remote data center) so as to provide non-disruptive operations even if, for example, an entire data center becomes non-functional, by seamlessly failing over the storage access to the mirror copy hosted in the other data center.

According to some embodiments, various operations (e.g., data replication, data migration, data protection, failover, and the like) may be performed at the level of granularity of a CG (e.g., CG 115*a* or CG 115*b*). A CG is a collection of storage objects or data containers (e.g., volumes) within a cluster that are managed by a Storage Virtual Machine (e.g., SVM 111*a* or SVM 111*b*) as a single unit. In various embodiments, the use of a CG as a unit of data replication guarantees a dependent write-order consistent view of the dataset and the mirror copy to support zero RPO and zero RTO. CGs may also be configured for use in connection with taking simultaneous snapshot images of multiple volumes, for example, to provide crash-consistent copies of a dataset associated with the volumes at a particular point in time.

The volumes of a CG may span multiple disks (e.g., electromechanical disks and/or SSDs) of one or more storage nodes of the cluster. A CG may include a subset or all volumes of one or more storage nodes. In one example, a CG includes a subset of volumes of a first storage node and a subset of volumes of a second storage node. In another example, a CG includes a subset of volumes of a first storage node, a subset of volumes of a second storage node, and a subset of volumes of a third storage node. A CG may be referred to as a local CG or a remote CG depending upon the perspective of a particular cluster. For example, CG 115*a* may be referred to as a local CG from the perspective of cluster 110*a* and as a remote CG from the perspective of cluster 110*b*. Similarly, CG 115*a* may be referred to as a remote CG from the perspective of cluster 110*b* and as a local CG from the perspective of cluster 110*b*. At times, the volumes of a CG may be collectively referred to herein as members of the CG and may be individually referred to as a member of the CG. In one embodiment, members may be added or removed from a CG after it has been created.

A cluster may include one or more SVMs, each of which may contain data volumes and one or more logical interfaces (LIFs) (not shown) through which they serve data to clients. SVMs may be used to securely isolate the shared virtualized data storage of the storage nodes in the cluster, for example, to create isolated partitions within the cluster. In one embodiment, an LIF includes an Internet Protocol (IP) address and its associated characteristics. Each SVM may have a separate administrator authentication domain and can be managed independently via a management LIF to allow, among other things, definition and configuration of the associated CGs.

In the context of the present example, the SVMs make use of a configuration database (e.g., replicated database (RDB) 112*a* and 112*b*), which may store configuration information for their respective clusters. A configuration database provides cluster wide storage for storage nodes within a cluster. The configuration information may include, among other things, relationship information specifying a high-availability (HA) partner node for each node within a cluster, the status and direction of data replication (e.g., between clusters) at the volume level and/or at the CG level, the source and destination volume relationships (which may at times be referred to as volume-level CG relationship information). The configuration information may also include the roles of individual CGs, a set of CGs, and member volumes of the CGs as well as the status of mediators associated with the CGs. A pair of CGs may be said to be "peered" when one is protecting the other. For example, a CG (e.g., CG 115*b*) to which data is configured to be synchronously replicated may be referred to as being in the role of a destination CG, whereas the CG (e.g., CG 115*a*) being protected by the destination CG may be referred to as the source CG. Similarly, a pair of volumes in different CGs (e.g., a local CG and a remote CG) may be said to be "peered" when one is protecting the other. For example, a member volume of the remote CG (e.g., CG 115*b*) to which data is configured to be synchronously replicated may be referred to as being in the role of a destination volume, whereas the member volume of the local CG (e.g., CG 115*a*) being protected by the destination volume may be referred to as the source volume. Various events (e.g., transient or persistent network connectivity issues, availability/unavailability of the mediator, site failure, volume relocation, node failure, and the like) impacting the stretch cluster may result in the relationship information being updated at the cluster, CG level, and/or volume level to reflect changed status, relationships, and/or roles.

The level of granularity of operations supported by a CG is useful for various types of applications. As a non-limiting example, consider an application, such as a database application, that makes use of multiple volumes, including maintaining logs on one volume and the database on another volume. In such a case, the application may be assigned to a local CG of a first cluster that maintains the primary dataset, including an appropriate number of member volumes to meet the needs of the application, and a remote CG, for maintaining a mirror copy of the primary dataset, may be established on a second cluster to protect the local CG.

While in the context of various embodiments described herein, a volume of a CG may be described as performing certain actions (e.g., taking other members of a CG out of synchronization, disallowing/allowing access to the dataset or the mirror copy, issuing consensus protocol requests, etc.), it is to be understood such references are shorthand for an SVM or other controlling entity, managing or containing the volume at issue, performing such actions on behalf of the volume.

While in the context of various examples described herein, data replication may be described as being performed in a synchronous manner between a paired set of (or "peered") CGs associated with different clusters (e.g., from a primary cluster to a secondary cluster) or a paired set of (or "peered") volumes associated with different CGs, data replication may also be performed asynchronously and/or within the same cluster. Similarly, a single remote CG may protect multiple local CGs and/or multiple remote CGs may protect a single local CG. For example, a local CG can be setup for double protection by two remote CGs via fan-out or cascade topologies. In addition, those skilled in the art will appreciate a cross-site high-availability (HA) solution may include more than two clusters, in which a mirrored copy of a dataset of a primary cluster is stored on more than one secondary cluster.

The various nodes (e.g., storage nodes 136*a-n* and storage node 200) of the distributed storage systems described herein, and the processing described below with reference to the flow diagrams of FIGS. 8-10 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, the processing may be performed by one or more virtual or physical computer systems (e.g., servers, network storage systems or appliances, blades, etc.) of various forms, such as the computer system described with reference to FIG. 12 below.

Figure 6A:
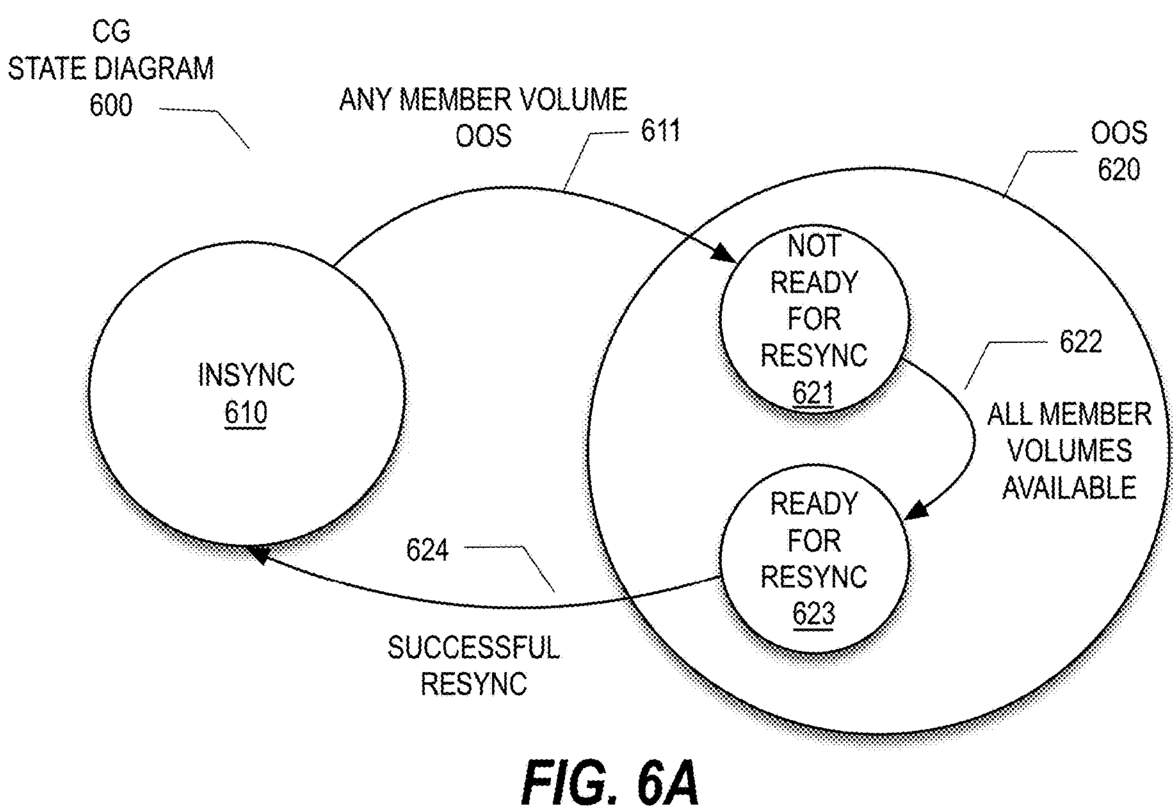
FIG. 6A is a CG state diagram in accordance with an embodiment of the present disclosure.

FIG. 6A is a CG state diagram 600 in accordance with an embodiment of the present disclosure. In the context of the present example, the data replication status of a CG can generally be in either of an InSync state (e.g., InSync 610) or an OOS state (e.g., OOS 620). Within the OOS state, two sub-states are shown, a not ready for resync state 621 and a ready for resync state 623.

While a given CG is in the InSync state, the mirror copy of the primary dataset associated with the member volumes of the given CG may be said to be in-synchronization with the primary dataset and asynchronous data replication or synchronous data replication, as the case may be, are operating as expected. When a given CG is in the OOS state, the mirror copy of the primary dataset associated with the member volumes of the given CG may be said to be out-of-synchronization with the primary dataset and asynchronous data replication or synchronous data replication, as the case may be, are unable to operate as expected. Information regarding the current state of the data replication status of a CG may be maintained in a configuration database (e.g., RDB 512*a* or 512*b*).

As noted above, in various embodiments described herein, the members (e.g., volumes) of a CG may be managed as a single unit for various situations. In the context of the present example, the data replication status of a given CG is dependent upon the data replication status of the individual member volumes of the CG. A given CG may transition 611 from the InSync state to the not ready for resync state 621 of the OOS state responsive to any member volume of the CG becoming OOS with respect to a peer volume with which the member volume is peered. A given CG may transition 622 from the not ready for resync state 621 to the ready for resync state 623 responsive to all member volumes being available. In order to support recovery from, among other potential disruptive events, manual planned disruptive events (e.g., balancing of CG members across a cluster) a resynchronization process (which may be referred to as a CG-level resynchronization or CG-level resync) may be performed to bring the CG back into the InSync state from the OOS state. Responsive to a successful CG-level resync, a given CG may transition 624 from the ready for resync state 623 to the InSync state. In one embodiment, the CG-level resync process involves the use of the last common snapshot and snapshots are periodically performed (e.g., every hour).

Figure 6B:
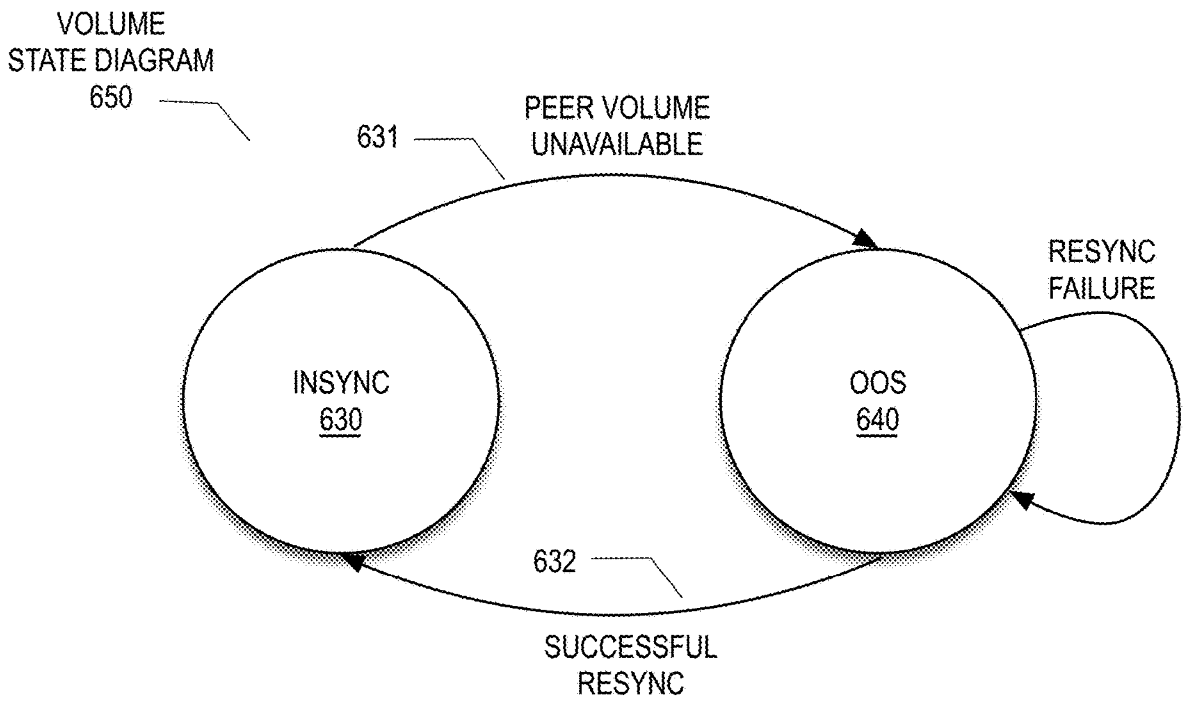
FIG. 6B is a volume state diagram in accordance with an embodiment of the present disclosure.

FIG. 6B is a volume state diagram 650 in accordance with an embodiment of the present disclosure. In the context of the present example, the data replication status of a volume can be in either of an InSync state (e.g., InSync 630) or an OOS state (e.g., OOS 640). While a given volume of a local CG (e.g., CG 515*a*) is in the InSync state, the given volume may be said to be in-synchronization with a peer volume of a remote CG (e.g., CG 515*b*) and the given volume and the peer volume are able to communicate with each other via the potentially unreliable network (e.g., network 205), for example, through their respective LIFs. When a given volume of the local CG is in the OOS state, the given volume may be said to be out-of-synchronization with the peer volume of the remote CG and the given volume and the peer volume are unable to communicate with each other. According to one embodiment, a periodic health check task may continuously monitor the ability to communicate between a pair of peered volumes. Information regarding the current state of the data replication status of a volume may be maintained in a configuration database (e.g., RDB 512*a* or 512*b*).

A given volume may transition 631 from the InSync state to the OOS state responsive to a peer volume being unavailable. A given volume may transition 632 from the OOS state to the InSync state responsive to a successful resynchronization with the peer volume. In one embodiment, two different types of resynchronization approaches may be implemented, including a Fast Resync process and a CG-level resync process, and selected for use individually or in sequence as appropriate for the circumstances. The Fast Resync process may make an attempt to bring an individual volume of a CG that transitioned into the OOS state, for example, as a result of a disruptive operation back into the InSync state while allowing other volumes of the CG that were not affected by the disruptive operation to remain in the InSync state.

The Fast Resync approach may preserve write-order consistency of the mirror copy by temporarily disallowing access to the primary copy of data stored on the volume at issue and resuming access upon successful completion of the Fast Resync process. When the Fast Resync process is able to bring the volume at issue back into the InSync state with a time threshold (e.g., selected based on a typical command timeout interval), an application assigned to the CG at issue may be insulated from the disruptive event and a zero recovery point objective (RPO) guarantee may be maintained. In contrast, the CG-level resync process may preserve dependent write-order consistency of the mirror copy in a different manner. For example, responsive to any member volume of a given CG detecting it has gone OOS for any reason (e.g., a network failure), the CG-level resynch process may first involve performance of the coordinated CG-level OOS process in which all member volumes are driven OOS. This coordinated OOS approach is useful in a design in which I/O is desired to be allowed with one copy (local commit). As such, the other volumes in CG are disallowed from continuing to replicate writes so as to avoid dependent write-order inconsistency.

According to one embodiment, the Fast Resync process is attempted first for an individual volume that has become OOS and a slower CG-level resynchronization process (e.g., a coordinated CG-level OOS followed by a CG-level resync), may be avoided and may be used as a fallback for situations in which the Fast Resync process is unsuccessful in bringing the individual volume back into the InSync state within a time threshold (e.g., selected based on a typical command timeout interval).

A number of different approaches may be used to implement either or both of the Fast Resync process and the CG-level resync process, including, but not limited to, the use of persistent tracking of inflight operations being replicated from the primary cluster to the secondary cluster, the use of snapshots, and combinations thereof. As such, the performance of a resynchronization to bring the data replication status back into synchronization may be simply referred to herein as a resync process to reflect the non-limiting nature of the resync process.

While the specific details regarding the CG-level resync are not necessary for the understanding of the proactive steps described herein that are performed to facilitate a reduced Reseed Time Period, for purposes of completeness, it is noted that the CG-level Resync process may involve performing a coordinated CG-level OOS process in which all member volumes are driven OOS followed by a CG-level resync as described in co-pending U.S. patent application Ser. No. 17/219,759, which is hereby incorporated by reference in its entirety for all purposes.

Similarly, the Fast Resync process is not necessary for understanding the proactive steps described herein to facilitate a reduced Reseed Time Period, however, for purposes of completeness, it is noted that the Fast Resync process may involve the use of a persistent inflight tracker to perform a persistent inflight tracking (IFT-P) replay as described in co-pending U.S. patent application Ser. No. 17/495,990, which is hereby incorporated by reference in its entirety for all purposes.

Caching of Volume-Level CG Relationship Information

In various examples, active cache entries and/or passive cache entries may be proactively maintained within a cache in kernel space of each storage node (e.g., storage node 136*a-n*, 146*a-n*, 311, 312, 321, 322, or 400) of a cluster to facilitate reduction of the Reseed Time Period. An "active cache entry" refers to a cache entry containing volume-level CG relationship information (e.g., a source volume ID and destination volume ID pair representing a peered pair of volumes in different CGs) that is permissible for a resync process to use when attempting to resynchronize the data replication status between peered CGs or peered volumes. An active cache entry may include a flag/bit or otherwise be tagged or marked as an active cache entry to distinguish it from a passive cache entry. A cache should only include active cache entries for those volumes that are members of a CG and that are owned (or hosted) by the node on which the cache resides. A "passive cache entry" refers to a cache entry containing volume-level CG relationship information for which it is impermissible for a resync process to make use of when attempting to resynchronize the data replication status between peered CGs or peered volumes. A passive cache entry may include a flag/bit or otherwise be tagged or marked as a passive cache entry to distinguish it from an active cache entry. The resync process should not make use of passive cache entries because they represent placeholders until such time as they are converted to active cache entries. A cache should only include active cache entries for those volumes that are members of a CG and that are owned (or hosted) by the node on which the cache resides.

In one embodiment, the general mechanism to reduce the Reseed Time Period involves the creation of a passive cache entry, containing volume-level CG relationship information for a volume, in a new node to which the volume is being relocated prior to the volume coming online in the new node.

There are two general kinds of disruptive operations (i) relocating a volume from its original node to its HA partner node; and (ii) moving the volume from the original node to any other node (i.e., a non-HA partner node) in the cluster. While there may be other types of disruptive operations, some may ultimately represent one of these two general kinds of disruptive operations. For example, a node failure, resulting in a failover to the original node's HA partner, generally involves the relocation of all volumes owned by the original node to the original node's HA partner node. A high-level overview of post-processing relating to these two general kinds of disruptive operations is provided below before moving on to a more detailed description of example cache update scenarios.

Volume Relocation to HA Partner Node

When a volume is relocated to its HA partner node, in order to start the resync process more quickly upon completion of this kind of disruptive operation, a copy of the volume-level CG relationship information cache is kept in the HA partner node proactively apart from having the cache in its original node. This cache entry copy that is maintained in the HA partner node represents the aforementioned "passive cache entry" and may be created at the time the CG relationship is created, for example.

Because the passive cache entry is proactively made available on the HA partner node, when the volume relocates to the HA partner node and comes online in the HA partner node, the resync process can start immediately by making use of the volume-level CG relationship information contained in the passive cache entry. For example, as soon as the volume comes online, instead of waiting for user space to seed the cache information into the HA partner node, the resync process may be started as soon as the passive cache entry is converted to an actual cache entry in the kernel, thereby reducing the Reseed Time Period and allowing the resync process to start more quickly.

At the same time, the active cache entry in the original node may be converted to a passive cache entry so as to support volume movement back to the original node at later point in time by the same mechanism described above.

Volume Relocation to Non-HA Partner Node

For the other category of disruptive operation in which the volume is moved elsewhere in the cluster (i.e., to a non-HA partner node), the passive cache entry may be created as part of the volume move operation during a pre-cutover phase (e.g., prior to cutover during which the volume is brought offline in the original node and brought online in the new node). During the pre-cutover phase, the cross-site storage solution will know where exactly the volume is moving and hence can create a passive cache entry in the new node at that time. Since the passive entry is created during the pre-cutover phase, when the cutover happens (i.e., the volume is brought offline in original node and brought online in the new node), the passive cache is readily available. In this manner, as soon as the cutover completes, the passive cache entry can be converted to an active cache entry and the resynchronization process may be started immediately without waiting for the user space to seed the volume-level CG relationship information cache in the new node. In order to support the first category of disruptive operations (i.e., volume relocation to an HA partner node), during the pre-cutover phase, in addition to creating the passive cache entry in the new node, a passive cache entry is also in the new node's HA partner node (the non-HA partner's HA partner).

Before describing non-limiting examples of user-space initiated cache update processing and kernel-space initiated cache update processing, a few simplified cache update scenarios are described with reference to FIGS. 7A-D. In the context of these scenarios a limited number of nodes, volumes, and cache entries are depicted to avoid unnecessary complexity. Based on these simplified cache update scenarios, those skilled in the art will be able to extrapolate to more complex scenarios involving more nodes, more volumes, and/or more cache entries.

Initial Cache State

Figures 7A, 7B:
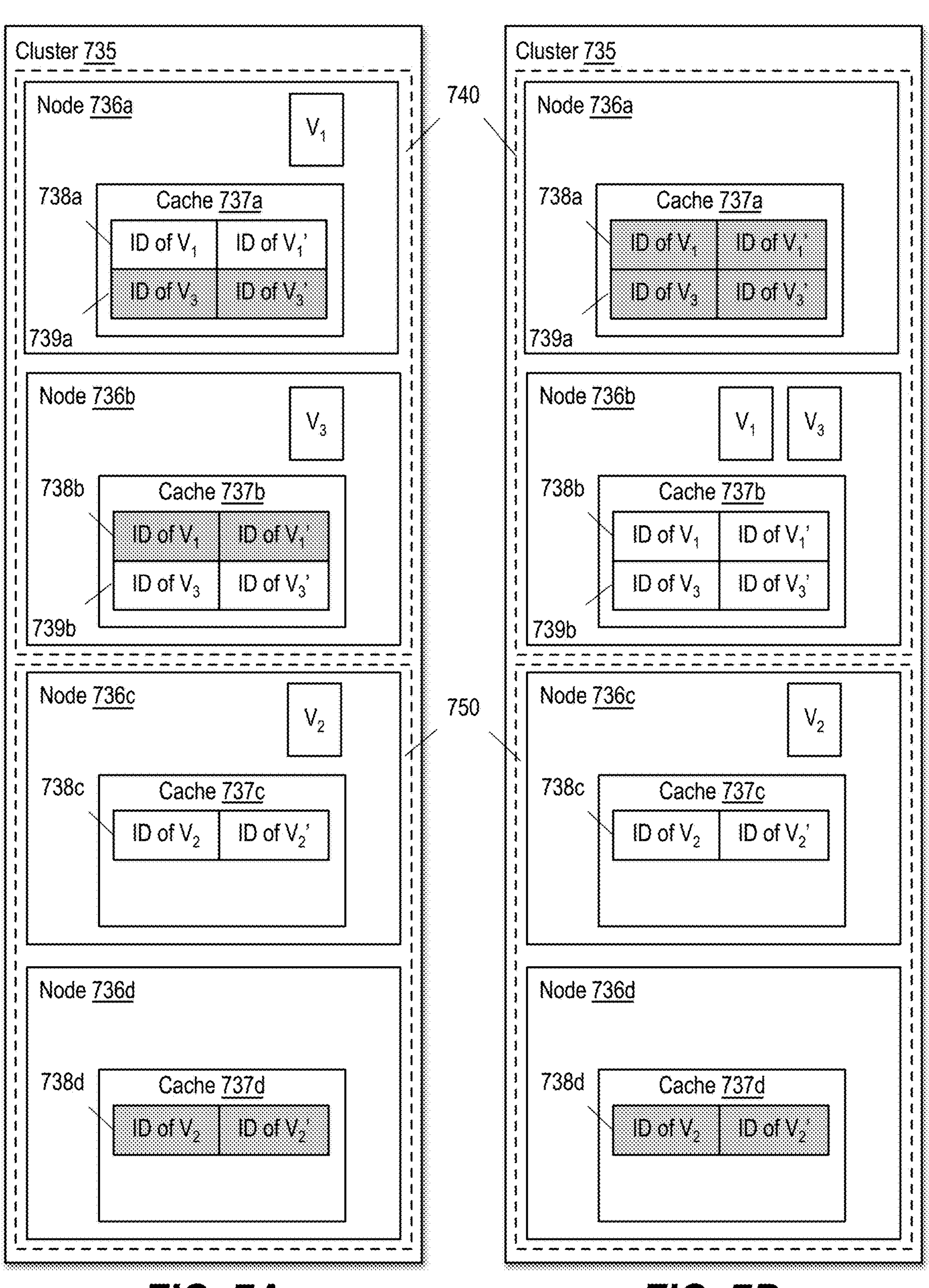
FIG. 7A is a block diagram illustrating an initial cache state of various nodes of a cluster in accordance with an embodiment of the present disclosure.
FIG. 7B is a block diagram illustrating an updated cache state of various nodes of a cluster responsive to a volume being moved to an HA partner node in accordance with an embodiment of the present disclosure.

FIG. 7A is a block diagram illustrating an initial cache state of various nodes 736*a-d* of a cluster 735 in accordance with an embodiment of the present disclosure. In the context of the present example, nodes 736*a* and 736*b* represent an HA node pair 740. That is, node 736*a* is an HA partner of node 736*b* and vice versa. In the present example, nodes 736*c* and 736*d* also represent an HA node pair 750. In the context of the present example, it is assumed each node of an HA node pair should be prepared to take over for the other should its HA partner fail. By convention, active cache entries are depicted with a white background and passive cache entries are depicted with a gray background.

In its initial state, node 736*a* includes a cache 737*a* having an active cache entry 738*a* containing volume-level CG relationship information for volume $V_1$, which is owned by node 736*a*, and a passive cache entry 739*a* (corresponding to active cache entry 739*b*) containing volume-level CG relationship information for volume $V_3$, which is owned by its HA partner, node 736*b*. The active cache entry 738*a* indicates the direction of data replication is from $V_1$ (a member of a local CG) to $V_1'$ (a member of a peered remote CG that protects the local CG), for example, by including a source volume ID of $V_1$ (in which $V_1$ represents the primary volume of the peered pair of volumes $V_1$ and $V_1'$) and a destination volume ID of $V_1$ (in which $V_1'$ represents the secondary volume of the peered pair of volumes).

In its initial state, node 736*b* includes a cache 737*b* having an active cache entry 739*b* containing volume-level CG relationship information for volume $V_3$, which is owned by node 736*b*, and a passive cache entry 738*b* (corresponding to active cache entry 738*a*) containing volume-level CG relationship information for volume $V_1$, which is owned by its HA partner, node 736*a*. The active cache entry 739*b* indicates the direction of data replication is from $V_3$ (a member of the local CG) to $V_3$ (a member of the peered remote CG), for example, by including a source volume ID of $V_3$ (in which $V_3$ represents the primary volume of the peered pair of volumes $V_3$ and $V_3'$) and a destination volume ID of $V_1'$ (in which $V_3'$ represents the secondary volume of the peered pair of volumes).

Turning now to the other HA node pair 750, it includes node 736*c* and node 736*d*. Node 736*c* includes a cache 737*c* having an active cache entry 738*c* containing volume-level CG relationship information for volume $V_2$, which is owned by node 736*c* and no passive cache entries (as its HA partner, node 736*d*, owns no volumes). The active cache entry 738*c* indicates the direction of data replication is from $V_2$ (a member of the local CG) to $V_2'$ (a member of the peered remote CG), for example, by including a source volume ID of $V_2$ (in which $V_2$ represents the primary volume of the peered pair of volumes $V_2$ and $V_2'$) and a destination volume ID of $V_2'$ (in which $V_2'$ represents the secondary volume of the peered pair of volumes).

Node 736*d* includes a cache 737*d* having a passive cache entry 739*d* containing volume-level CG relationship information for volume $V_2$, which is owned by node 736*c* and no active cache entries (as node 736*d* owns no volumes). Like the corresponding active cache entry 738*c* of cache 737*c*, the passive cache entry 738*d* indicates the direction of data replication is from $V_2$ (a member of the local CG) to $V_2'$ (a member of the peered remote CG), for example, by including a source volume ID of $V_2$ (in which $V_2$ represents the primary volume of the peered pair of volumes $V_2$ and $V_2'$) and a destination volume ID of $V_2'$ (in which $V_2'$ represents the secondary volume of the peered pair of volumes).

Updated Cache State—Volume Move to HA Partner

FIG. 7B is a block diagram illustrating an updated cache state of various nodes of a cluster responsive to a volume being moved to an HA partner node in accordance with an embodiment of the present disclosure. In the context of the present example, FIG. 7A represents the initial state of caches 737*a* and 737*b* and FIG. 7B represents the updated states of caches 737*a* and 737*b* as a result of a disruptive operation (i.e., a volume relocation of $V_1$ from node 736*a* to its HA partner, node 736*b*). In this scenario, node 736*a* no longer owns any volumes and node 736*b* now owns both $V_1$ and $V_3$.

Because node 736*a* no longer owns $V_1$, cache entry 738*a* is converted from active to passive. In one embodiment, for example, as described further below with reference to FIGS. 8-9 and 11, this conversion of cache entry 738*a* may be performed responsive to a triggering event (e.g., remove volume) sent from a cluster-level component or process of the cross-site storage solution to a user-space component or process of the cross-site storage solution running on node 736*a*.

Additionally, the previously existing cache entry 738*b* for $V_1$ on node 736*b* is converted from passive to active. In one embodiment, for example, as described further below with reference to FIGS. 10-11, this conversion of cache entry 738*b* may be performed responsive to a triggering event (e.g., volume online) sent from a kernel-space component or process of the cross-site storage solution running on node 736*b* to another kernel-space component or process of the cross-site storage solution running on node 736*b*.

Updated Cache State—Node Failure

Figures 7C, 7D:
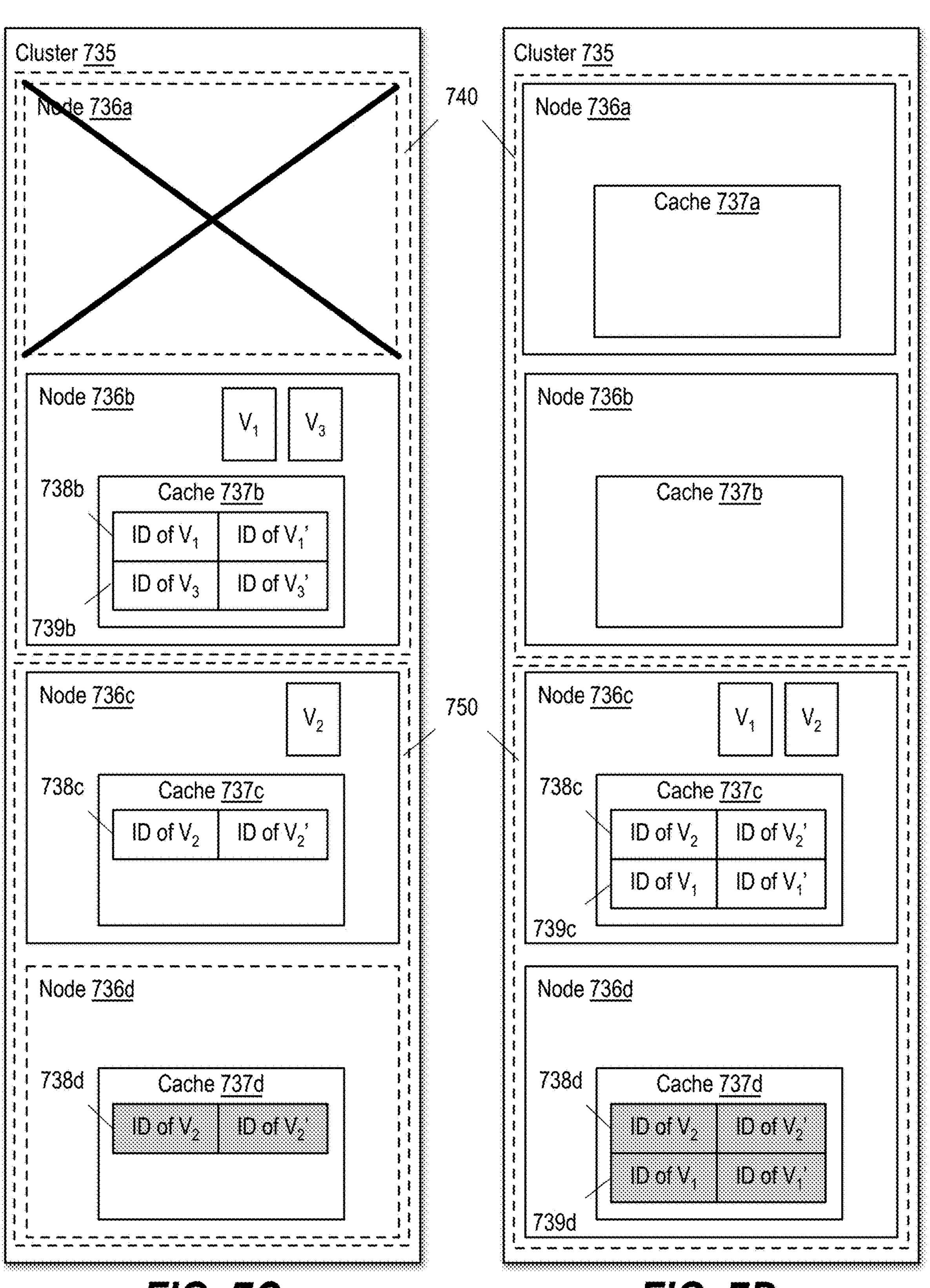
FIG. 7C is a block diagram illustrating an updated cache state of various nodes of a cluster responsive to a node failure in accordance with an embodiment of the present disclosure.
FIG. 7D is a block diagram illustrating an updated cache state of various nodes of a cluster responsive to a volume being moved to a non-HA partner node in accordance with an embodiment of the present disclosure.

FIG. 7C is a block diagram illustrating an updated cache state of various nodes of a cluster responsive to a node failure in accordance with an embodiment of the present disclosure. In the context of the present example, FIG. 7A represents the initial state of caches 737*a* and 737*b* and FIG. 7C represents the updated states of caches 737*a* and 737*b* as a result of a disruptive operation (i.e., a failure of node 736*a*). In this scenario, all volumes previously owned by node 736*a* (in this simplified example, just $V_1$) are relocated from node 736*a* to its HA partner, node 736*b*. As a result, node 736*b* now owns both $V_1$ and $V_3$.

Because node 736*a* has failed, there is no need to convert former cache entry 738*a* from active to passive as discussed above with reference to FIG. 7B; however, the previously existing cache entry 738*b* for $V_1$ on node 736*b* should be converted from passive to active as in the case of FIG. 7B since node 736*b* is the new owner of $V_1$.

Updated State—Volume Move to Non-HA Partner

FIG. 7D is a block diagram illustrating an updated cache state of various nodes of a cluster responsive to a volume being moved to a non-HA partner node in accordance with an embodiment of the present disclosure. In the context of the present example, FIG. 7A again represents the initial state of caches 737*a* and 737*b* and FIG. 7D represents the updated states of caches 737*a* and 737*b* as a result of a disruptive operation (i.e., a volume relocation of $V_1$ from node 736*a* to a non-HA partner, node 736*c*). In this scenario, node 736*a* no longer owns any volumes and node 736*c* now owns both $V_1$ and $V_2$.

Because node 736*a* no longer owns $V_1$ and $V_1$ was moved to a non-HA partner, former active cache entry 738*a* is removed from cache 737*a*. In one embodiment, for example, as described further below with reference to FIGS. 8-9 and 11, this removal of cache entry 738*a* may be performed responsive to a triggering event (e.g., remove volume) sent from a cluster-level component or process of the cross-site storage solution to a user-space component or process of the cross-site storage solution running on node 736*a*.

Similarly, because node 736*a* no longer owns $V_1$ and $V_1$ was moved to a non-HA partner, former passive cache entry 738*b* is removed from cache 737*b*. In one embodiment, for example, as described further below with reference to FIGS. 8-9 and 11, this removal of cache entry 738*b* may be performed responsive to a triggering event (e.g., remove volume) sent from a cluster-level component or process of the cross-site storage solution to a user-space component or process of the cross-site storage solution running on node e 736*b*.

In addition, the previously existing cache entry 739*c* for $V_1$ on node 736*c* is converted from passive to active. In one embodiment, for example, as described further below with reference to FIGS. 10-11, this conversion of cache entry 739*c* may be performed responsive to a triggering event (e.g., volume online) sent from a kernel-space component or process of the cross-site storage solution running on node 736*c* to another kernel-space component or process of the cross-site storage solution running on node 736*c*.

Finally, because passive cache entries should be maintained on one HA partner nodes for each volume owned by the other HA partner node, a new passive cache entry 739*a* is added to cache 737*d* of node 736*d* (the HA partner of node 736*c*). In one embodiment, for example, as described further below with reference to FIGS. 8-9 and 11, this addition of cache entry 738*d* may be performed responsive to a triggering event (e.g., add volume) sent from a cluster-level component or process of the cross-site storage solution to a user-space component or process of the cross-site storage solution running on node 736*d*.

Disruptive Operation Post-Processing

Figure 8:
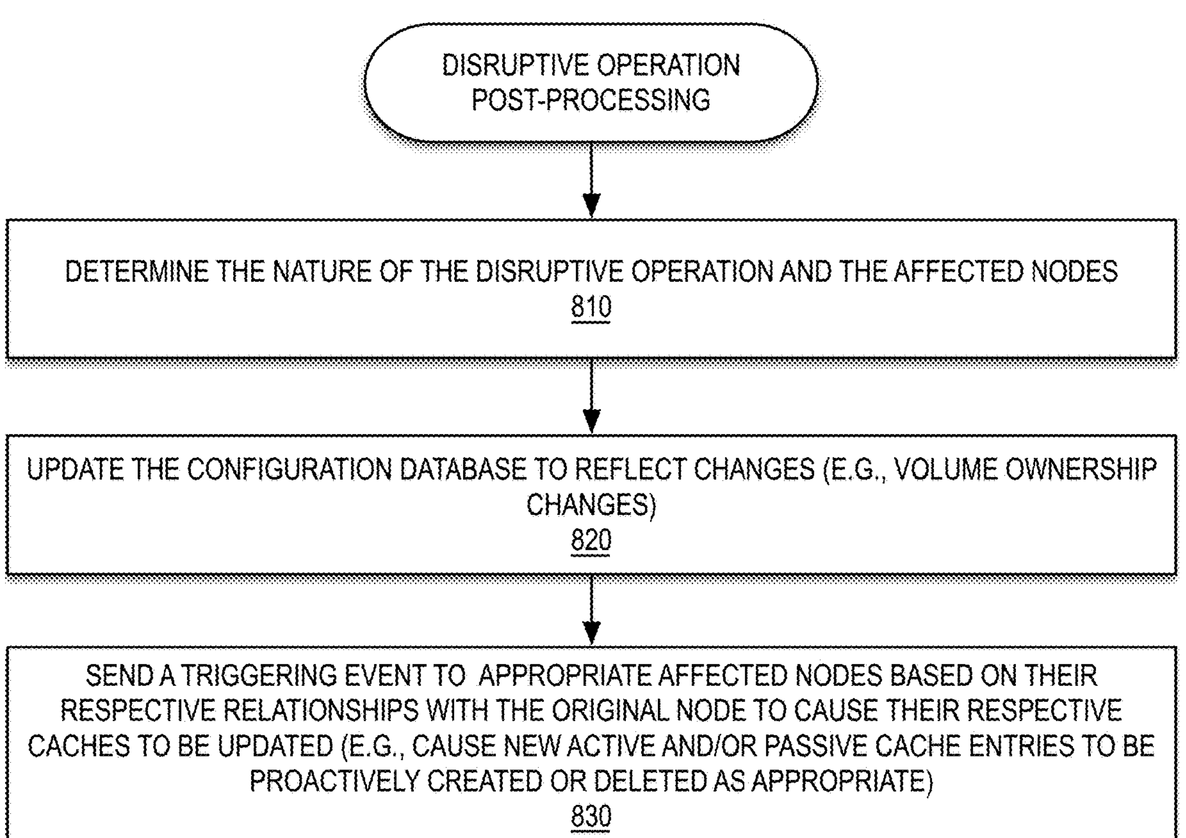
FIG. 8 is a flow diagram illustrating a set of operations for performing disruptive operation post-processing in accordance with an embodiment of the present disclosure.

FIG. 8 is a flow diagram illustrating a set of operations for performing disruptive operation post-processing in accordance with an embodiment of the present disclosure. In the context of the present example, it is assumed the configuration database (e.g., RDB 112*a*, 112*b*, 512*a*, or 512*b*) includes information (e.g., the node ID) indicative of the nodes in each HA node pair (e.g., HA node pair 740 and 750) within the cluster (e.g., cluster 735) and that a disruptive operation (e.g., moving either the primary or secondary volume location within a cluster from one node to another node or a failure of a node within the primary or secondary cluster) has completed. At this point, post-processing should be performed to update the configuration database and to update the caches (e.g., caches 737*a-d*) of the appropriate nodes of those affected by the disruptive operation.

At block 810, the nature of the disruptive operation and the affected nodes are determined. For example, it is determined whether the disruptive operation was a node failure or a volume relocation. Furthermore, the node IDs of the source node (the original node) and the destination node (the new node) of a volume relocation or the node ID of the failed node is determined. Additionally, when the volume relocation is to a non-HA partner node, the node ID of its HA partner node may also be determined.

At block 820, the configuration database is updated to reflect changes. For example, after a volume (e.g., $V_1$, $V_2$, or $V_3$) of FIGS. 7A-D has been relocated from one node (e.g., one of nodes 736*a-d*) to another node (e.g., another of nodes 736*a-d*), a mapping of node IDs to volume IDs indicative of which volumes are owned by which nodes may be updated to replace the source volume ID with the destination volume ID for the volume at issue.

At block 830, a triggering event is sent to appropriate affected nodes to cause their respective caches to be updated. For example, the update may involve causing new active and/or passive cache entries to be created or deleted as appropriate based on the triggering event. For purposes of illustration, using the example scenarios described above with reference to FIGS. 7B-D, the following triggering events may be sent:

- Responsive to completion of the relocation of $V_1$ from node 736*a* to its HA partner, node 736*b*, as shown in FIG. 7B, as a passive cache entry 738*b* already exists within cache 737*b*, there is no need to create a new cache entry. As such, there is no need to send a triggering event at this point to node 736*b*; and a single triggering event (e.g., remove volume) may be sent to node 736*a*. In one embodiment, the remove volume event causes node 736*a* to convert cache entry 739*a* from active to passive. The conversion of cache entry 738*b* in node 736*b* from passive to active may be triggered responsive to a subsequent kernel-space event (e.g., volume online) sent from the file system as described below with reference to FIG. 10.
- Responsive to completion of a failover from node 736*a* to node 736*b* as a result of a failure of node 736*a* as shown in FIG. 7C, there is no need to convert former cache entry 738*a* from active to passive (as node 736*a* has failed). As such, there is no need to send a triggering event to node 736*a*. Furthermore, as a passive cache entry 738*b* already exists containing the volume-level CG relationship information for $V_1$ within cache 737*b*, there is no need to create a new cache entry and therefore no need to send a triggering event at this point to node 736*b*. As above, the conversion of cache entry 738*b* in node 736*b* from passive to active may be triggered responsive to a subsequent kernel-space event (e.g., volume online) sent from the file system as described below with reference to FIG. 10.
- Responsive to completion of the relocation of $V_1$ from node 736*a* to a non-HA partner (e.g., node 736*c*) as shown in FIG. 7D, a first triggering event (e.g., add volume) may be sent to node 736*c*, a second triggering event (e.g., add volume) may be sent to node 736*d*, a third triggering event (e.g., remove volume) may be sent to node 736*a*, and a fourth triggering event (e.g., remove volume) may be sent to node 736*b*. In one embodiment, the first add volume event referenced above causes node 736*c* to add a new (passive) cache entry 739*c* containing the volume-level CG relationship information for $V_1$ within cache 737*c*, the second add volume event referenced above causes node 736*d* to add passive cache entry 739*d* to cache 737*d*, and the two remove volume move events referenced above cause nodes 736*a* and 736*b* to remove cache entries 738*a* and 738*a*, respectively, leaving caches 737*a* and 737*b* empty. As above, the conversion of cache entry 739*c* from passive to active may be triggered responsive to a subsequent kernel-space event (e.g., volume online) sent from the file system as described below with reference to FIG. 10.

While in the context of the present example, a number of enumerated blocks are included, it is to be understood that examples may include additional blocks before, after, and/or in between the enumerated blocks. Similarly, in some examples, one or more of the enumerated blocks may be omitted or performed in a different order.

It is also to be appreciated, although various examples described herein discuss individual volume relocations, multiple volumes may be moved as part of a relocation of an aggregate (e.g., a set of disks).

User-Space Initiated Cache Update Processing

Figure 9:
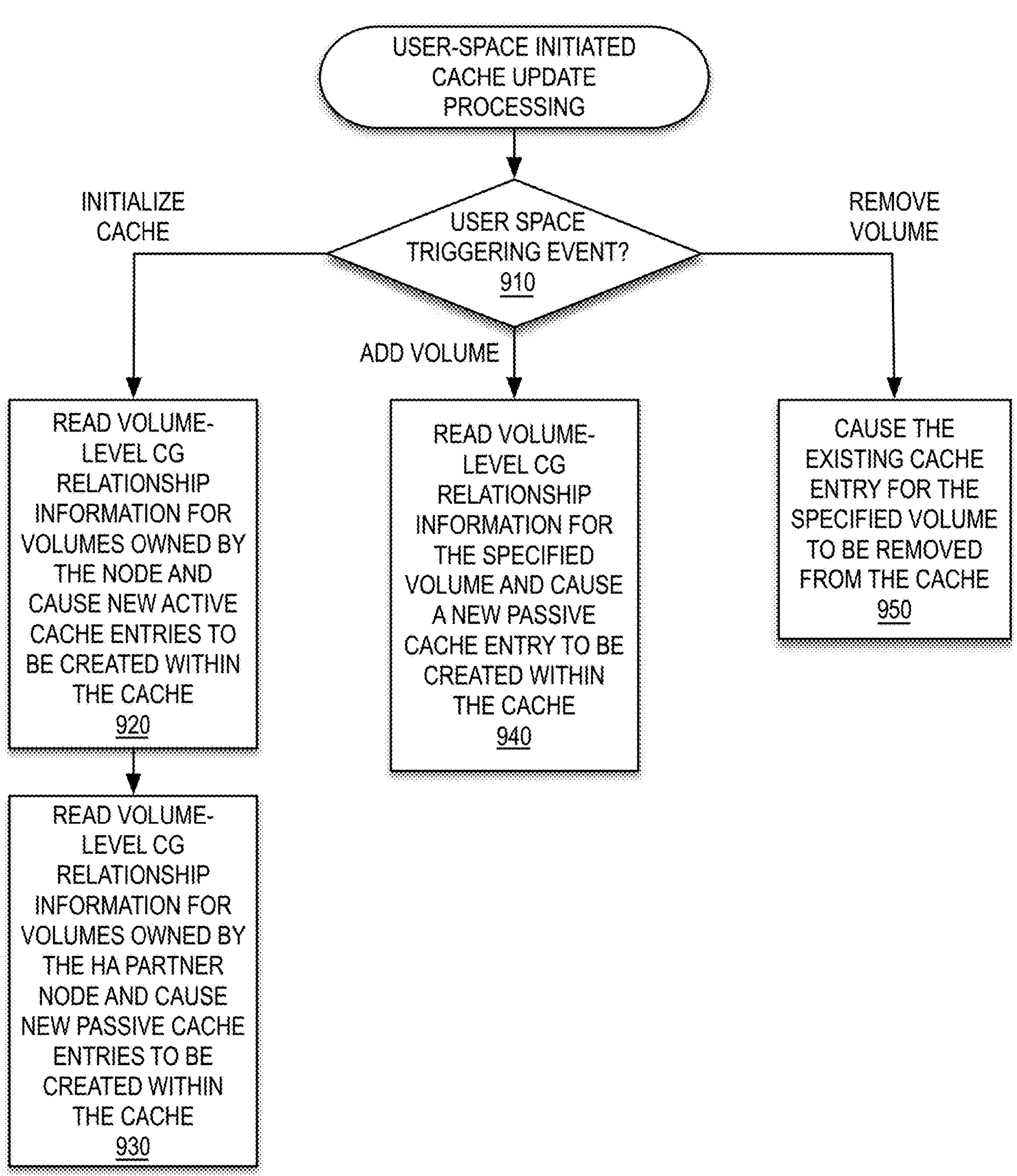
FIG. 9 is a flow diagram illustrating a set of operations for performing user-space initiated cache update processing in accordance with an embodiment of the present disclosure.

FIG. 9 is a flow diagram illustrating a set of operations for performing user-space initiated cache update processing in accordance with an embodiment of the present disclosure. Depending upon the particular implementation, some triggering events (e.g., initialize cache, add volume, and remove volume) may be sent from a cluster-level component or process of the cross-site storage solution to a user-space component or process of the cross-site storage solution running on a particular node (e.g., one of nodes 736*a-d*) and others (e.g., volume online) may be sent from a kernel-space component or process of the cross-site storage solution running on a given node to another kernel-space component or process of the cross-site storage solution running on the given node. FIG. 9 illustrates the handling of the following types of user-space triggering events (e.g., initialize cache, add volume, and remove volume) from the perspective of a node that is being direct to update its cache in accordance with the type of triggering event. In the context of the present example, it is assumed a disruptive event has completed and a particular affected node has received a triggering event (e.g., as a result of the processing described above with reference to FIG. 8) by a user-space component or process of the cross-site storage solution.

At decision block 910, the type of user-space triggering event is determined. When the triggering event is one that directs the affected node to initialize its cache (e.g., one of caches 737*a-c*), for example, as a result of a boot process completing, processing continues with block 920. When the triggering event is one that directs the affected node to add volume-level CG relationship information to its cache for a specified volume, processing continues with block 940. When the triggering event is one that directs the affected node to remove volume-level CG relationship information from its cache for a specified volume, processing continues with block 990.

At block 920, the volume-level CG relationship information for volumes owned by the affected node is read and new active cache entries are created within the affected node's cache. For example, all volume-level CG relationship information for volumes associated with the node ID of the affected node may be read from the configuration database. Then, the volume-level CG relationship information may be used to create the new active cache entries.

At block 930, the volume-level CG relationship information for volumes owned by the HA partner node of the affected node is read and new passive cache entries are created within the affected node's cache. For example, all volume-level CG relationship information for volumes associated with the node ID of the affected node may be read from the configuration database. Then, the volume-level CG relationship information may be used to create the new passive cache entries. As described below with reference to FIG. 11, in one embodiment, portions of the cache update processing associated with blocks 920 and 930 may be divided between a user-space component or process and a kernel-space component or process of the cross-site storage solution.

At block 940, the volume-level CG relationship information for the specified volume is read and a new passive cache entry is caused to be created within the cache of the affected node. For example, based on the volume ID of the specified volume, the volume-level CG relationship information for the specified volume may be retrieved from the configuration database. Then, the volume-level CG relationship information may be used to create the new passive cache entry. As described below with reference to FIG. 11, in one embodiment, portions of the cache update processing associated with block 970 may be divided between a user-space component or process and a kernel-space component or process of the cross-site storage solution. As explained above with reference to FIG. 8, the add volume triggering event may be sent to the new node when it represents a non-HA partner of the original node and to a node representing the HA partner of the non-HA partner (the new node).

At block 950, the existing cache entry for the specified volume is caused to be removed from the cache of the affected node. In one embodiment, a remove volume event is sent to both the original node from which the volume was moved and the HA partner of the original node. When the affected node represents the original node, the active cache entry for the specified volume may be removed from the cache of the original node. When the affected node represents the HA partner node of the original node, the passive cache entry for the specified volume may be removed from the cache of the HA partner node.

While in the context of the present example, a number of enumerated blocks are included, it is to be understood that examples may include additional blocks before, after, and/or in between the enumerated blocks. Similarly, in some examples, one or more of the enumerated blocks may be omitted or performed in a different order.

Kernel-Space Initiated Cache Update Processing

Figure 10:
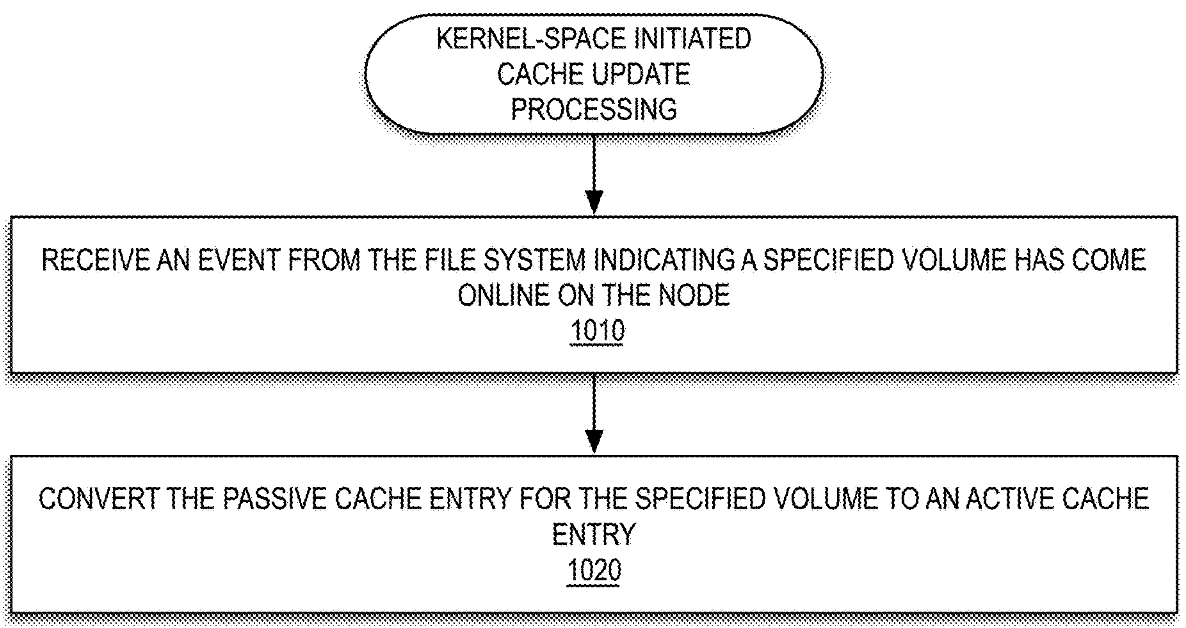
FIG. 10 is a flow diagram illustrating a set of operations for performing kernel-space initiated cache update processing in accordance with one embodiment of the present disclosure.

FIG. 10 is a flow diagram illustrating a set of operations for performing kernel-space initiated cache update processing in accordance with one embodiment of the present disclosure. In the context of the present example, it is assumed a disruptive operation (e.g., moving either the primary or secondary volume location within a cluster from one node to another node or a failure of a node within the primary or secondary cluster) has completed and user-space post-processing (e.g., as described above with reference to FIGS. 8 and 9) has already been performed to update the caches (e.g., caches 737*a-d*) of the nodes affected by the disruptive operation.

At block 1010, an event is received from the file system (e.g., a write-anywhere file system, such as the proprietary Write Anywhere File Layout (WAFL) Copy-on-Write file system available from NetApp, Inc. of San Jose, CA) indicating a specified volume has come online in the node. The event may be a kernel-space event (e.g., volume online) originated by a kernel-space component or process of the file system running on the node that is generated responsive to the specified volume coming online. The node may represent an HA partner node of the original node from which the specified volume was moved or a non-HA partner node of the original node. In either case, a passive cache entry should be present on the node for the specified volume, for example, as a result of block 930 or 940 of FIG. 9.

At block 1020, the passive cache entry for the specified volume is converted from a passive cache entry to an active cache entry. In this manner, the active cache entry is available for use by the resync process to bring the status of data replication between the specified volume within the local CG and its peer volume within the remote CG back into a state of synchronization (e.g., InSync 630).

Figure 11:
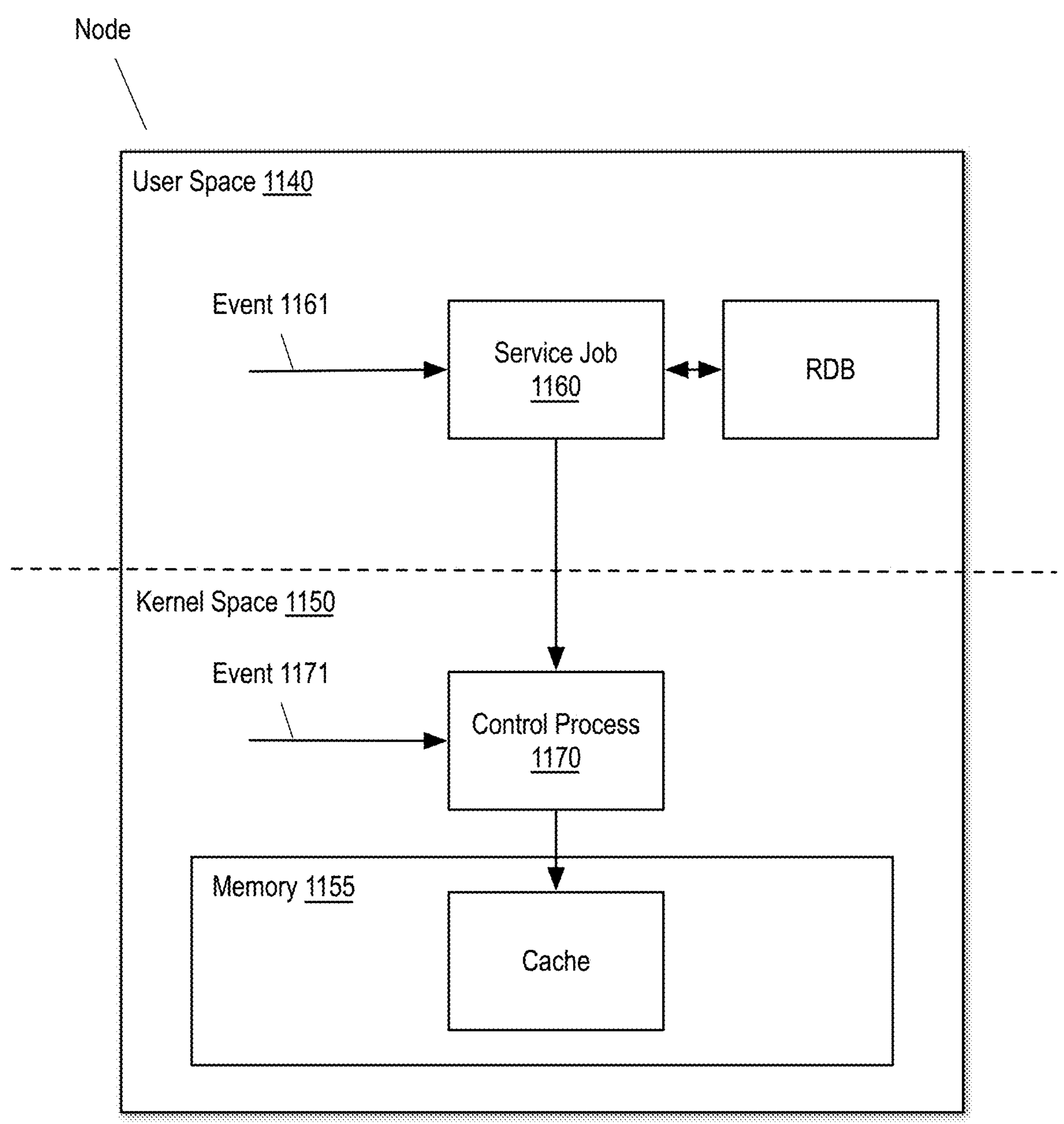
FIG. 11 is a block diagram illustrating various functional units associated with volume-level CG relationship information seeding in accordance with an embodiment of the present disclosure.

FIG. 11 is a block diagram illustrating various functional units associated with volume-level CG relationship information seeding in accordance with an embodiment of the present disclosure. As noted above, in some examples, cache update processing (e.g., associated with blocks 920, 930, and 940 of FIG. 9) may be divided between user space (e.g., user space 1140) and kernel space (e.g., kernel space 1150). This may be as a result of where information is stored and/or where events are originated. For example, in a cross-site storage solution architecture in which the configuration database (e.g., RDB 112*a*, 112*b*, 512*a*, or 512*b*) is accessible within the user space 1140, activities associated with retrieval from and/or storage to the configuration database may be performed in the user space 1140. Similarly, in a cross-site storage solution architecture in which a cache (e.g., one of caches 737*a-d*) is maintained within a kernel memory (e.g., memory 1155) activities associated with addition, removal, and/or conversion of cache entries may be performed in the kernel space 1150.

In the context of the present example, a node (e.g., one of nodes 736*a-d*) is shown including user-space 1140 (e.g., representing a user-space portion of the cross-site storage solution running on the node) and kernel space 1150 (e.g., representing a kernel-space portion of the cross-site storage solution running on the node). The user-space 1140 is shown including a service job 1160, which may represent a user-space process or component of the cross-site storage solution that is responsible for perform user-space post-processing tasks. For example, the service job 1160 may be responsible for disruptive operation post-processing involving retrieval of information (e.g., volume-level CG relationship information for a given volume ID or the HA partner node ID of a given node ID) from the RDB (e.g., the configuration database) responsive to event 1161 (e.g., initialize cache, add volume, or remove volume). The user space 1140 may also be responsible for directing the control process 1170 to add a new cache entry or remove an existing cache entry for a specified volume.

The kernel space 1150 is shown including the cache within memory 1155. The kernel-space also includes a control process 1170, which may represent a kernel-space process or component of the cross-site storage solution that is responsible for perform kernel-space tasks following a disruptive operation. For example, the control process 1170 may be responsible for disruptive operation post-processing involving conversion of a cache entry within the cache from passive to active responsive to a file system event (e.g., event 1171). The file system event (e.g., volume online) may represent a specified volume coming online in the node. The kernel space 1150 may also perform certain processing responsive to requests from user space 1140. For example, the control process 1170 may add a new cache entry to the cache or remove a cache entry from the cache for a specified volume ID at the direction of the service job 1160.

Example Computer System

Embodiments of the present disclosure include various steps, which have been described above. The steps may be performed by hardware components or may be embodied in machine-executable instructions, which may be used to cause a processing resource (e.g., a general-purpose or special-purpose processor) programmed with the instructions to perform the steps. Alternatively, depending upon the particular implementation, various steps may be performed by a combination of hardware, software, firmware and/or by human operators.

Embodiments of the present disclosure may be provided as a computer program product, which may include a non-transitory machine-readable storage medium embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more non-transitory machine-readable storage media containing the code according to embodiments of the present disclosure with appropriate special purpose or standard computer hardware to execute the code contained therein. An apparatus for practicing various embodiments of the present disclosure may involve one or more computers (e.g., physical and/or virtual servers) (or one or more processors within a single computer) and storage systems containing or having network access to computer program(s) coded in accordance with various methods described herein, and the method steps associated with embodiments of the present disclosure may be accomplished by modules, routines, subroutines, or subparts of a computer program product.

Figure 12:
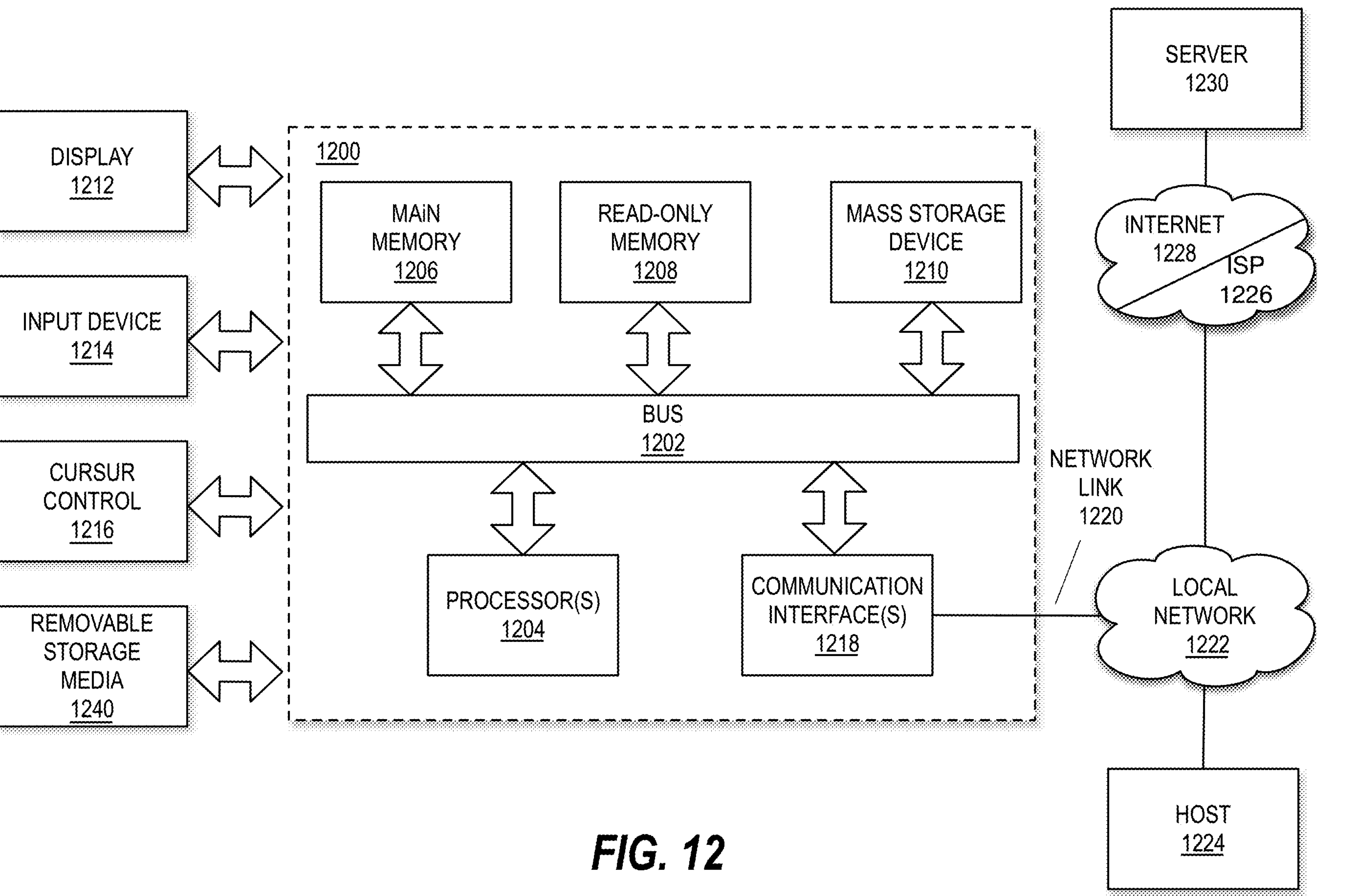
FIG. 12 illustrates an example computer system in which or with which embodiments of the present disclosure may be utilized.

FIG. 12 is a block diagram that illustrates a computer system 1200 in which or with which an embodiment of the present disclosure may be implemented. Computer system 1200 may be representative of all or a portion of the computing resources associated with a node (e.g., storage nodes 136*a-n* or storage nodes 146*a-n*) of a distributed storage system (e.g., cluster 235 or 245) or an administrative workstation (e.g., computer system 120 or 210). Notably, components of computer system 1200 described herein are meant only to exemplify various possibilities. In no way should example computer system 1200 limit the scope of the present disclosure. In the context of the present example, computer system 1200 includes a bus 1202 or other communication mechanism for communicating information, and a processing resource (e.g., a hardware processor 1204) coupled with bus 1202 for processing information. Hardware processor 1204 may be, for example, a general-purpose microprocessor.

Computer system 1200 also includes a main memory 1206, such as a random-access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, e.g., a magnetic disk, optical disk or flash disk (made of flash memory chips), is provided and coupled to bus 1202 for storing information and instructions.

Computer system 1200 may be coupled via bus 1202 to a display 1212, e.g., a cathode ray tube (CRT), Liquid Crystal Display (LCD), Organic Light-Emitting Diode Display (OLED), Digital Light Processing Display (DLP) or the like, for displaying information to a computer user. An input device 1214, including alphanumeric and other keys, is coupled to bus 1202 for communicating information and command selections to processor 1204. Another type of user input device is cursor control 1216, such as a mouse, a trackball, a trackpad, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Removable storage media 1240 can be any kind of external storage media, including, but not limited to, hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), USB flash drives and the like.

Computer system 1200 may implement the techniques described herein using customized hard-wired logic, one or more ASICs or FPGAs, firmware or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data or instructions that cause a machine to operation in a specific fashion. Such storage media may comprise non-volatile media or volatile media. Non-volatile media includes, for example, optical, magnetic or flash disks, such as storage device 1210. Volatile media includes dynamic memory, such as main memory 1206. Common forms of storage media include, for example, a flexible disk, a hard disk, a solid-state drive, a magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid-state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the worldwide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, or stored in storage device 1210, or other non-volatile storage for later execution.

What is claimed is:

1. A method performed by one or more processing resources of a distributed storage system, the method comprising:

after a volume of a consistency group (CG) has been moved from a source node of a plurality of nodes of the distributed storage system to a destination node of the plurality of nodes, identifying those of the plurality of nodes affected by movement of the volume;

updating volume ownership information maintained by the distributed storage system to reflect volume ownership changes of the source node and the destination node resulting from the movement of the volume; and selectively causing one or more of (i) an existing cache entry maintained by at least one of the affected nodes to be modified, (ii) the existing cache entry to be removed, and (iii) a new cache entry to be created by at least another of the affected nodes.

2. The method of claim 1, wherein the destination node represents a high-availability (HA) partner of the source node and wherein said selectively causing comprises causing the source node to convert an active cache entry relating to the volume to a passive cache entry.

3. The method of claim 2, further comprising causing the HA partner to convert a passive cache entry relating to the volume to an active cache entry.

4. The method of claim 1, wherein the destination node represents a non-HA partner of the source node and wherein said selectively causing comprises:

causing the destination node to add an active cache entry relating to the volume to a cache maintained by the destination node;

causing an HA partner of the destination node to add a passive cache entry relating to the volume to a cache maintained by the HA partner of the destination node;

causing the source node to remove an active cache entry relating to the volume from a cache maintained by the source node; and causing an HA partner of the source node to remove a passive cache entry relating to the volume from a cache maintained by the HA partner of the source node.

5. The method of claim 1, wherein the movement of the volume is due to a failover from the source node to the destination node.

6. A distributed storage system in a form of a cluster of a plurality of nodes, the distributed storage system comprising:

one or more processors; and one or more non-transitory computer-readable media, coupled to the one or more processors, having stored therein instructions that when executed by the one or more processors cause the distributed storage system to:

after a volume of a consistency group (CG) has been moved from a source node of a plurality of nodes of the distributed storage system to a destination node of the plurality of nodes, identify those of the plurality of nodes affected by movement of the volume;

update volume ownership information maintained by the distributed storage system to reflect volume ownership changes of the source node and the destination node resulting from the movement of the volume; and selectively cause one or more of (i) an existing cache entry maintained by at least one of the affected nodes to be modified, (ii) the existing cache entry to be removed, and (iii) a new cache entry to be created by at least another of the affected nodes.

7. The distributed storage system of claim 6, wherein the destination node represents a high-availability (HA) partner of the source node and wherein selectively causing the existing cache entry to be modified comprises causing the source node to convert an active cache entry relating to the volume to a passive cache entry.

8. The distributed storage system of claim 7, wherein the instructions further cause the distributed storage system to cause the HA partner to convert a passive cache entry relating to the volume to an active cache entry.

9. The distributed storage system of claim 6, wherein the destination node represents a non-HA partner of the source node and wherein selectively causing the new cache entry to be created comprises:

causing the destination node to add an active cache entry relating to the volume to a cache maintained by the destination node; or causing an HA partner of the destination node to add a passive cache entry relating to the volume to a cache maintained by the HA partner of the destination node.

10. The distributed storage system of claim 9, wherein selectively causing the existing cache entry to be removed comprises:

causing the source node to remove an active cache entry relating to the volume from a cache maintained by the source node; and causing an HA partner of the source node to remove a passive cache entry relating to the volume from a cache maintained by the HA partner of the source node.

11. The distributed storage system of claim 6, wherein the movement of the volume is not due to a failover from the source node to the destination node.

12. The distributed storage system of claim 6, wherein the movement of the volume is due to a failover from the source node to the destination node.

13. The distributed storage system of claim 6, wherein the distributed storage system is part of a stretched storage system including another distributed storage system remote from the distributed storage system.

14. A non-transitory computer-readable storage medium embodying a set of instructions, which when executed by one or more processors of a distributed storage system represented in a form of a cluster of a plurality of nodes, cause the distributed storage system to:

after a volume of a consistency group (CG) has been moved from a source node of the plurality of nodes to a destination node of the plurality of nodes, identify those of the plurality of nodes affected by movement of the volume;

update volume ownership information maintained by the distributed storage system to reflect volume ownership changes of the source node and the destination node resulting from the movement of the volume; and selectively cause one or more of (i) an existing cache entry maintained by at least one of the affected nodes to be modified, (ii) the existing cache entry to be removed, and (iii) a new cache entry to be created by at least another of the affected nodes.

15. The non-transitory computer-readable storage medium of claim 14, wherein the destination node represents a high-availability (HA) partner of the source node and wherein selectively causing the existing cache entry to be modified comprises causing the source node to convert an active cache entry relating to the volume to a passive cache entry.

16. The non-transitory computer-readable storage medium of claim 15, wherein the instructions further cause the distributed storage system to cause the HA partner to convert a passive cache entry relating to the volume to an active cache entry.

17. The non-transitory computer-readable storage medium of claim 14, wherein the destination node represents a non-HA partner of the source node and wherein selectively causing the new cache entry to be created comprises:

causing the destination node to add an active cache entry relating to the volume to a cache maintained by the destination node; or causing an HA partner of the destination node to add a passive cache entry relating to the volume to a cache maintained by the HA partner of the destination node.

18. The non-transitory computer-readable storage medium of claim 17, wherein selectively causing the existing cache entry to be removed comprises:

causing the source node to remove an active cache entry relating to the volume from a cache maintained by the source node; and causing an HA partner of the source node to remove a passive cache entry relating to the volume from a cache maintained by the HA partner of the source node.

19. The non-transitory computer-readable storage medium of claim 14, wherein the movement of the volume is due to a failover from the source node to the destination node.

20. The non-transitory computer-readable storage medium of claim 14, wherein the distributed storage system is part of a stretched storage system including another distributed storage system remote from the distributed storage system.

* * * * *